(12) United States Patent
Kishida et al.

(10) Patent No.: US 12,501,382 B2
(45) Date of Patent: Dec. 16, 2025

(54) BASE STATION AND TERMINAL APPARATUS FOR SYNCHRONIZING TIME IN MULTI-LINK

(71) Applicant: NTT, Inc., Tokyo (JP)

(72) Inventors: Akira Kishida, Musashino (JP); Kengo Nagata, Musashino (JP); Yasuhiko Inoue, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 346 days.

(21) Appl. No.: 18/017,781

(22) PCT Filed: Jul. 27, 2020

(86) PCT No.: PCT/JP2020/028669
§ 371 (c)(1),
(2) Date: Jan. 24, 2023

(87) PCT Pub. No.: WO2022/024169
PCT Pub. Date: Feb. 3, 2022

(65) Prior Publication Data
US 2023/0269683 A1    Aug. 24, 2023

(51) Int. Cl.
*H04W 56/00* (2009.01)
*H04W 76/15* (2018.01)

(52) U.S. Cl.
CPC ....... *H04W 56/0015* (2013.01); *H04W 76/15* (2018.02)

(58) Field of Classification Search
CPC . H04W 56/0015; H04W 76/15; H04W 84/12; H04W 52/0216; H04W 52/0219;
(Continued)

(56) References Cited

U.S. PATENT DOCUMENTS

2015/0296466 A1* 10/2015 Takano ............... H04W 56/001
370/350
2021/0360522 A1* 11/2021 Chitrakar ............. H04L 5/0098

FOREIGN PATENT DOCUMENTS

| WO | WO-2011/108028 A1 | 9/2011 |
| WO | WO-2014/069106 A1 | 5/2014 |
| WO | WO-2020085997 A1 | 4/2020 |

OTHER PUBLICATIONS

IEEE Std 802.Nov. 2016, "9.3.3.3 Beacon frame format" and "11.1 Synchronization", Dec. 7, 2016.
(Continued)

*Primary Examiner* — Walli Z Butt
(74) *Attorney, Agent, or Firm* — Harness, Dickey & Pierce, P.L.C.

(57) ABSTRACT

A base station of an embodiment includes first and second wireless signal processing units, and a link management unit. The first wireless signal processing unit is configured to transmit and receive a wireless signal using a first channel. The second wireless signal processing unit is configured to transmit and receive a wireless signal using a second channel that is different from the first channel. The link management unit stores shared time information synchronizing multi-links. The link management unit establishes a multi-link with a terminal apparatus using the first and second wireless signal processing units, and causes each of the first and second wireless signal processing units to transmit a beacon signal including the shared time information while the multi-link is established.

6 Claims, 25 Drawing Sheets

(58) Field of Classification Search
CPC .......... H04W 52/0232; H04W 52/0258; H04L 5/001; H04L 5/0048; Y02D 30/70
See application file for complete search history.

(56) References Cited

OTHER PUBLICATIONS

Yongho Seok (MediaTek), Multi-link Operation Follow-up. IEEE 802.22-19/0979r2, Sep. 18, 2019, slides 1-14, in particular, slides 4, 7, slides 4, 7.
Sai (Cypress), Multiband and Multichannel Operation in IEEE 802.llbe, IEEE 802.22-19/1231r3, Jul. 15, 2019, slides 1-22, in particular, slides 7, 12-15, slides 7, 12-15.
International Search Report of the ISA (English and Japanese) issued in PCT/JP2020/028669, mailed Dec. 28, 2020; ISA/JP.
Verma, Sindhu et al., "Proposals on Multilink Power Save and Link Management", Mar. 2020.
Chu, Liwen et al., "Multi-Link Power Save", Sep. 9, 2019.
Park, Minyoung et al., "Multi-Link Power Save—Link Bitmap", Jan. 2020.
Song, Taewon et al., "Multi-link Management", IEEE 802.11-19/1943r2, Nov. 2019.

\* cited by examiner

Fig. 8

| STA FUNCTION | FREQUENCY BAND | OPERATION MODE | LINK DESTINATION ID | MULTI-LINK | TID |
|---|---|---|---|---|---|
| STA1 | 6GHz | ACTIVE | XX | O | #1,#2 |
| STA2 | 5GHz | ACTIVE | XX | O | #1,#3 |
| STA3 | 2.4GHz | OFF | - | - | - |

Fig. 12

| STA FUNCTION | FREQUENCY BAND | OPERATION MODE | LINK DESTINATION ID | MULTI-LINK | TID |
|---|---|---|---|---|---|
| STA1 | 6GHz | INTERMITTENT OPERATION | XX | O | #1,#2 |
| STA2 | 5GHz | OPERATION PAUSE | XX | O | #1,#3 |
| STA3 | 2.4GHz | OFF | - | - | - |

Fig. 15

| TERMINAL APPARATUS IDENTIFIER (AID) | LINK IDENTIFIER #1 (STA1) | BUFFER STATUS #1 (0/1) | LINK IDENTIFIER #2 (STA2) | BUFFER STATUS #2 (0/1) |
|---|---|---|---|---|

Fig. 22

| STA FUNCTION | FREQUENCY BAND | OPERATION MODE | LINK DESTINATION ID | MULTI-LINK | TID |
|---|---|---|---|---|---|
| STA1 | 6GHz | INTERMITTENT OPERATION | XX | O (PRIMARY) | #1,#2 |
| STA2 | 5GHz | OPERATION PAUSE | XX | O | #1,#3 |
| STA3 | 2.4GHz | OFF | - | - | - |

Fig 25

| STA FUNCTION | FREQUENCY BAND | CHANNEL ID | LINK DESTINATION ID | MULTI-LINK | TID |
|---|---|---|---|---|---|
| STA1 | 6GHz | CH1 | - | - | - |
| | | CH2 | XX | O | #1,#2 |
| | | CH3 | - | - | - |
| STA2 | 6GHz | CH1 | - | - | - |
| | | CH2 | - | - | - |
| | | CH3 | XX | O | #1,#3 |

BASE STATION AND TERMINAL APPARATUS FOR SYNCHRONIZING TIME IN MULTI-LINK

CROSS-REFERENCE TO RELATED APPLICATIONS

This application is a 371 U.S. National Phase of International Application No. PCT/JP2020/028669, filed on Jul. 27, 2020. The entire disclosure of the above application is incorporated herein by reference.

TECHNICAL FIELD

Embodiments relate to a base station and a terminal apparatus.

BACKGROUND ART

A wireless Local Area Network (LAN) is known as a wireless system for wirelessly connecting a base station and a terminal apparatus.

CITATION LIST

Non Patent Literature

NPL 1: IEEE Std 802.11-2016, "9.3.3.3 Beacon frame format" and "11.1 Synchronization," 7 Dec. 2016

SUMMARY OF INVENTION

Technical Problem

The problem is to suppress power consumption of a wireless terminal apparatus.

Means for Solution to Problem

A base station of an embodiment includes a first wireless signal processing unit, a second wireless signal processing unit, and a link management unit. The first wireless signal processing unit is configured to be able to transmit and receive a wireless signal using a first channel. The second wireless signal processing unit is configured to be able to transmit and receive a wireless signal using a second channel that is different from the first channel. The link management unit stores shared time information for synchronizing multi-links. The link management unit establishes the multi-link with a terminal apparatus using the first wireless signal processing unit and the second wireless signal processing unit, and causes each of the first wireless signal processing unit and the second wireless signal processing unit to transmit a beacon signal including the shared time information while the multi-link is established.

Advantageous Effects of Invention

The base station of the embodiment can suppress the power consumption of the wireless terminal apparatus.

BRIEF DESCRIPTION OF DRAWINGS

FIG. 8 is a table showing an example of link management information in the wireless system according to the embodiment.

FIG. 12 is a table showing an example of link management information in the wireless system according to the embodiment.

FIG. 15 is a conceptual diagram showing a specific example of a beacon signal including a traffic indication map (TIM) in the wireless system according to the embodiment.

FIG. 22 is a table showing an example of link management information in a wireless system according to a second modification example of the embodiment.

FIG. 25 is a table showing an example of link management information in the wireless system according to the third modification example of the embodiment.

DESCRIPTION OF EMBODIMENTS

Figure 1:
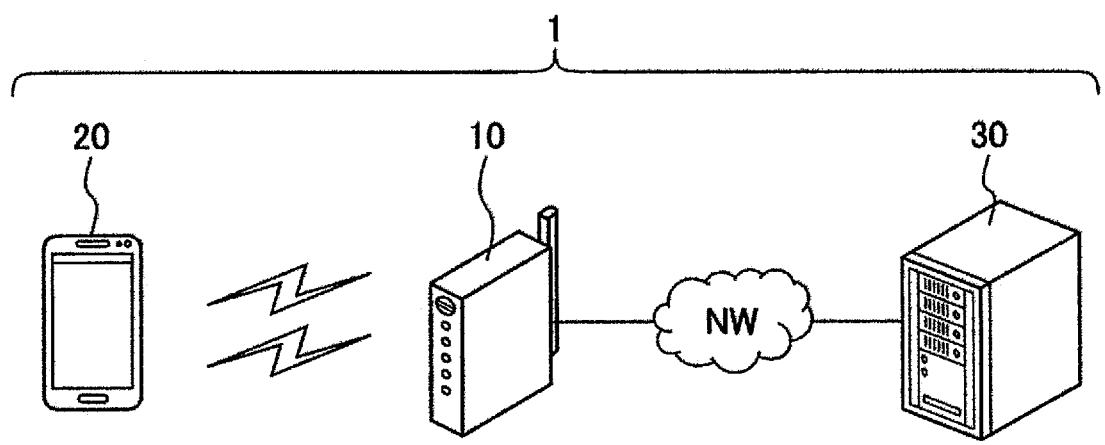
FIG. 1 is a conceptual diagram showing an example of an overall configuration of a wireless system according to an embodiment.

Hereinafter, a wireless system 1 according to an embodiment will be described with reference to the drawings. The embodiment illustrates an apparatus or method for embodying the technical idea of the invention. The drawings are schematic or conceptual. The dimensions and ratios of each drawing are not necessarily the same as the actual ones. The technical idea of the present invention is not specified by the shape, structure, arrangement, and the like of the constituent elements. In the following description, the constituent elements having substantially the same function and configuration are denoted by the same reference numerals.

<1> Configuration of Wireless System 1

<1-1> Overall Configuration of Wireless System 1

FIG. 1 shows an example of a configuration of the wireless system 1 according to the embodiment. As shown in FIG. 1, the wireless system 1 includes, for example, a base station 10, a terminal apparatus 20, and a server 30.

The base station 10 is connected to a network NW and is used as an access point of a wireless LAN. For example, the base station 10 can wirelessly distribute data received from the network NW to the terminal apparatus 20.

Also, the base station 10 can be connected to the terminal apparatus 20 using one type of band or a plurality of types of bands. In the present specification, a wireless connection between the base station 10 and the terminal apparatus 20 using a plurality of types of bands is referred to as a "multi-link." Communication between the base station 10 and the terminal apparatus 20 is based on, for example, the IEEE 802.11 standard.

The terminal apparatus 20 is, for example, a wireless terminal apparatus such as a smartphone or a tablet PC. The terminal apparatus 20 can transmit and receive data to and from the server 30 on the network NW via the base station 10, which is connected wirelessly. Note that the terminal apparatus 20 may be another electronic device such as a desktop computer or a laptop computer. The terminal apparatus 20 may be a device that can communicate with at least the base station 10 and can execute operations to be described later.

The server 30 can hold various types of information, and for example, holds data of content for the terminal apparatus 20. The server 30 is connected to, for example, the network NW by wire, and is configured to be able to communicate with the base station 10 via the network NW. Note that the server 30 may be able to communicate with at least the base station 10. That is, communication between the base station 10 and the server 30 may be by wire or wireless.

In the wireless system 1 according to the embodiment, the data communication between the base station 10 and the terminal apparatus 20 is based on an Open Systems Interconnection (OSI) reference model. Communication functions in the OSI reference model are divided into seven layers (Layer 1: physical layer, Layer 2: data link layer, Layer 3: network layer, Layer 4: transport layer, Layer 5: session layer, Layer 6: presentation layer, Layer 7: application layer).

The data link layer includes, for example, a Logical Link Control (LLC) layer and a Media Access Control (MAC) layer. The LLC layer adds a Destination Service Access Point (DSAP) header, a Source Service Access Point (SSAP) header, or the like to, for example, data input from a higher application to form an LLC packet. The MAC layer adds a MAC header to, for example, an LLC packet to form a MAC frame.

Figure 2:
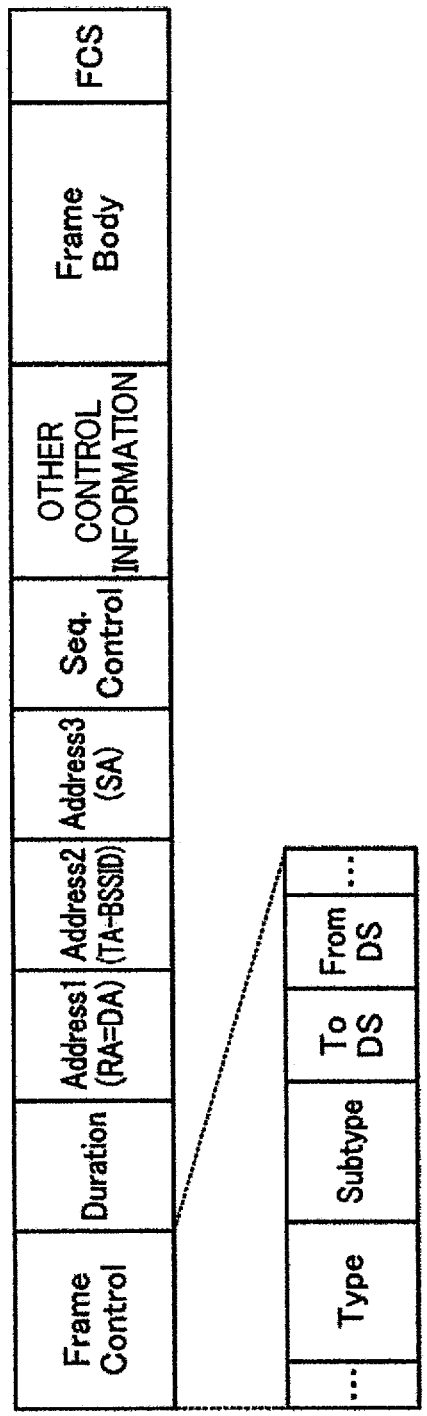
FIG. 2 is a conceptual diagram showing a specific example of a format of a wireless frame in the wireless system according to the embodiment.

FIG. 2 shows a specific example of a format of a wireless frame used in the communication between the base station 10 and the terminal apparatus 20 in the wireless system 1 according to the embodiment. As shown in FIG. 2, the wireless frame includes, for example, a Frame Control field, a Duration field, an Address1 field, an Address2 field, an Address3 field, a Sequence Control field, an other control information field, a Frame Body field, and a Frame Check Sequence (FCS) field.

The Frame Control field to the other control information field correspond to, for example, a MAC header included in a MAC frame. The Frame Body field corresponds to, for example, a MAC payload included in the MAC frame. The FCS field stores an error detection code of the MAC header and the Frame Body field, and is used to determine whether or not there is an error in the wireless frame.

The Frame Control field indicates various types of control information and includes, for example, a Type value, a Subtype value, a To Distribution System (To DS) value, and a From DS value. The Type value indicates the frame type of the wireless frame. For example, the Type value "00" indicates that the wireless frame is a management frame. The Type value "01" indicates that the wireless frame is a control frame. The Type value "10" indicates that the wireless frame is a data frame.

The content of the wireless frame changes depending on the combination of the Type value and the Subtype value. For example, "00/1000 (Type value/Subtype value)" indicates that the wireless frame is a beacon signal. The meanings of the To DS value and From DS value differ depending on the combination. For example, "00 (To DS/From DS)" indicates that the data is between terminal apparatuses in the same Independent Basic Service Set (IBSS). "10" indicates that the data frame is directed to the Distribution System (DS) from the outside. "01" indicates that the data frame is to go out of the DS. "11" is used when configuring a mesh network.

The Duration field indicates a scheduled period of using the wireless line. The plurality of Address fields indicate a BSSID, a transmission source address, a destination address, a sender terminal apparatus address, a recipient terminal apparatus address, and the like. The Sequence Control field indicates the sequence number of the MAC frame and the fragment number for the fragment. The other control information field includes, for example, traffic type "TID" information. The TID information may be inserted at other positions in the wireless frame. The Frame Body field includes information corresponding to the type of the frame. For example, the Frame Body field stores data when it corresponds to a data frame.

<1-2> Configuration of Base Station 10

Figure 3:
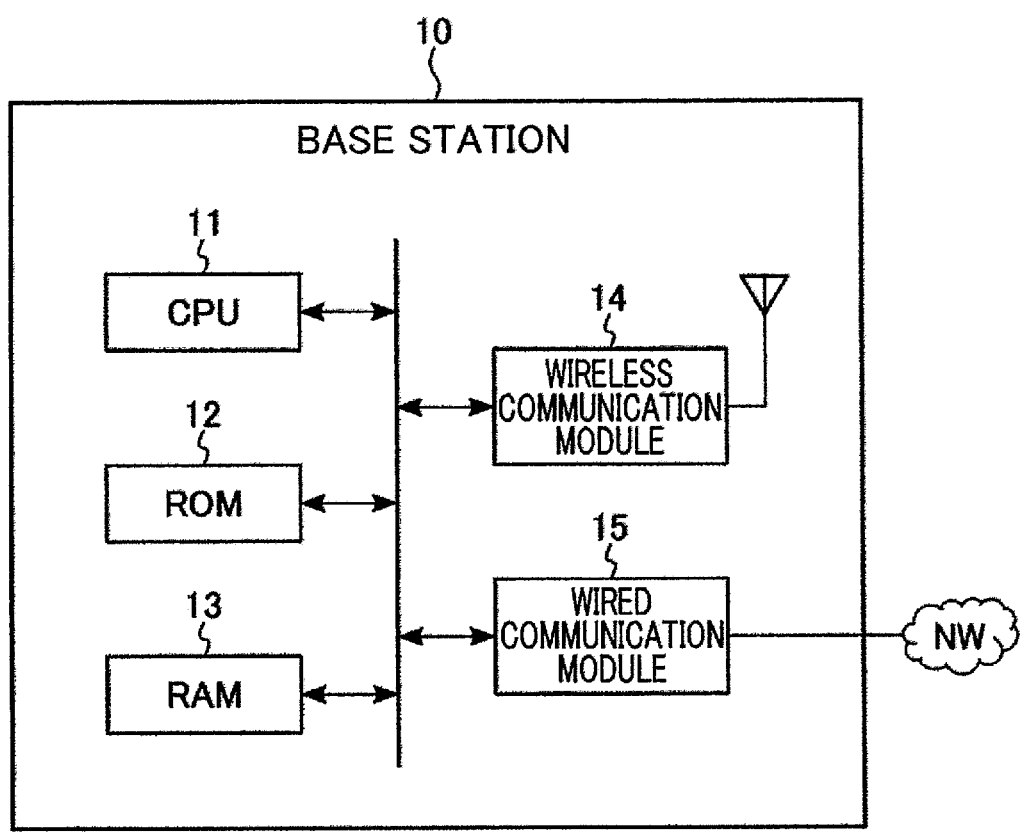
FIG. 3 is a block diagram showing an example of a configuration of a base station included in the wireless system according to the embodiment.

FIG. 3 shows an example of a configuration of the base station 10 included in the wireless system 1 according to the embodiment. As shown in FIG. 3, the base station 10 includes, for example, a Central Processing Unit (CPU) 11, a Read Only Memory (ROM) 12, a Random Access Memory (RAM) 13, a wireless communication module 14, and a wired communication module 15.

The CPU 11 is a circuit that can execute various programs, and controls the overall operation of the base station 10. The ROM 12 is a non-volatile semiconductor memory, and holds a program, control data, and the like for controlling the base station 10. The RAM 13 is, for example, a volatile semiconductor memory and is used as a work region of the CPU 11. The wireless communication module 14 is a circuit used for transmitting and receiving data by a wireless signal, and is connected to an antenna. Also, the wireless communication module 14 includes, for example, a plurality of communication modules that respectively correspond to a plurality of frequency bands. The wired communication module 15 is a circuit used for transmitting and receiving data by a wired signal, and is connected to the network NW.

Figure 4:
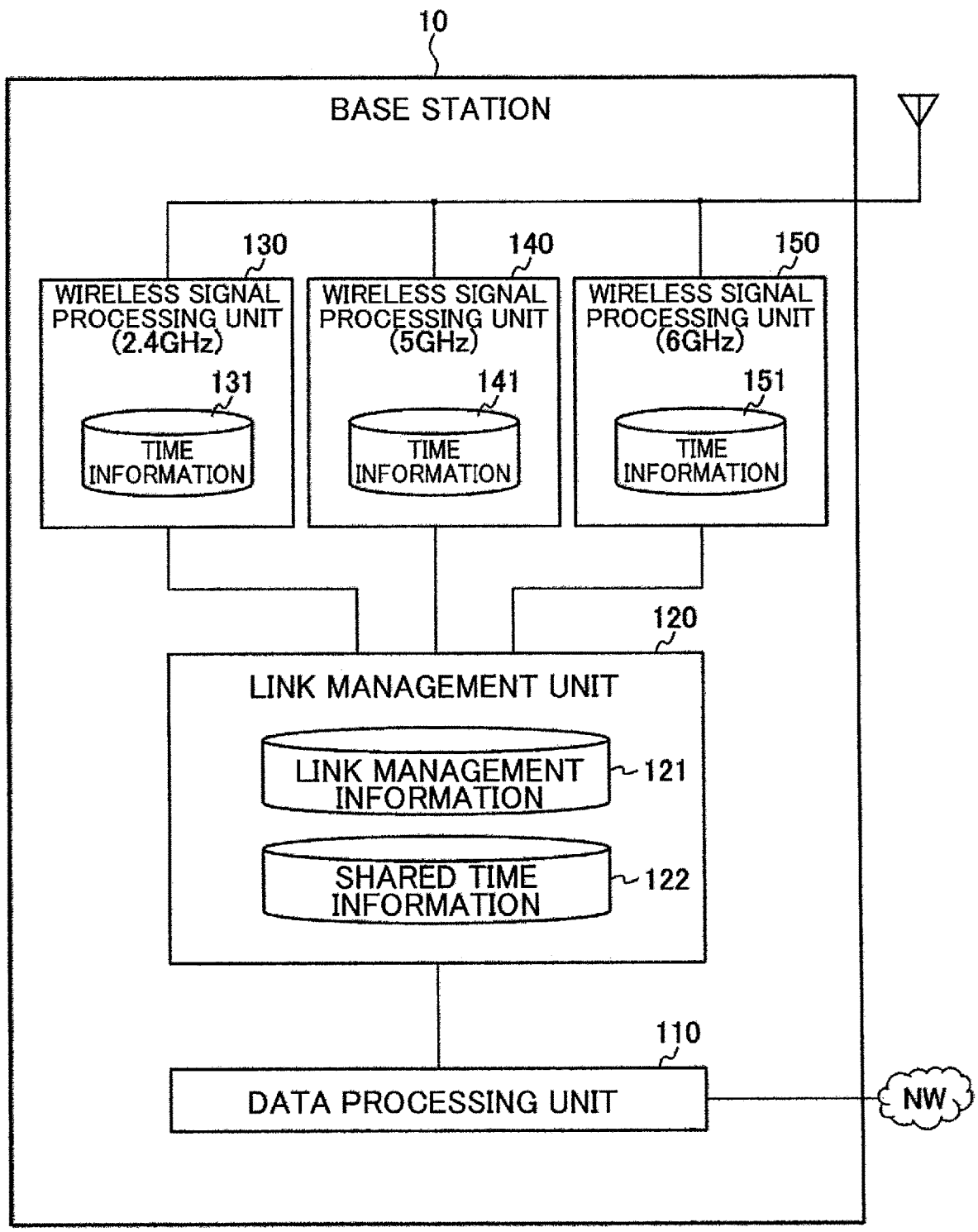
FIG. 4 is a block diagram showing an example of functions of the base station included in the wireless system according to the embodiment.

FIG. 4 shows an example of a functional configuration of the base station 10 included in the wireless system 1 according to the embodiment. As shown in FIG. 4, the base station 10 includes, for example, a data processing unit 110, a link management unit 120, and wireless signal processing units 130, 140, and 150. The processing of the data processing unit 110, the link management unit 120, and the wireless signal processing units 130, 140, and 150 is realized by, for example, the CPU 11 and the wireless communication module 14.

The data processing unit 110 can execute the processing of the LLC layer and the processing of the upper layer (the third layer to the seventh layer) on the input data. For example, the data processing unit 110 outputs the data input from the server 30 via the network NW to the link management unit 120. Also, the data processing unit 110 transmits the data input from the link management unit 120 to the server 30 via the network NW.

The link management unit 120 executes some of the processing of the MAC layer on the input data. Also, the link management unit 120 manages the link with the terminal apparatus 20 based on notifications from the wireless signal processing units 130, 140, and 150. The link management unit 120 holds link management information 121 and shared time information 122. The link management information 121 is stored in, for example, the RAM 13, and includes information on the terminal apparatus 20 that is wirelessly connected to the base station 10. The shared time information 122 holds time information shared in the base station 10 and can be referred to by each of the wireless signal processing units 130, 140 and 150. The shared time information 122 corresponds to time information for synchronizing the multi-links.

Each of the wireless signal processing units 130, 140, and 150 performs transmission and reception of data between the base station 10 and the terminal apparatus 20 using wireless communication. For example, each of the wireless signal processing units 130, 140, and 150 adds a preamble, a PHY header, or the like to the data input from the link management unit 120 to create a wireless frame. Then, each of the wireless signal processing units 130, 140, and 150 converts the wireless frame into a wireless signal and distributes the wireless signal via the antenna of the base station 10. Also, each of the wireless signal processing units 130, 140, and 150 converts the wireless signal received via the antenna of the base station 10 into a wireless frame. Then, each of the wireless signal processing units 130, 140, and 150 outputs the data included in the wireless frame to the link management unit 120

In this way, each of the wireless signal processing units 130, 140, and 150 can execute, for example, some of the processing of the MAC layer and the processing of the first layer on the input data or the wireless signal. For example, the wireless signal processing unit 130 handles wireless signals in a 2.4 GHz band. The wireless signal processing unit 140 handles wireless signals in a 5 GHz band. The wireless signal processing unit 150 handles wireless signals in a 6 GHz band. The wireless signal processing units 130, 140, and 150 may or may not share the antenna of the base station 10.

The wireless signal processing unit 130 holds time information 131. The time information 131 is used as a reference time of communication using the wireless signal processing unit 130. The wireless signal processing unit 140 holds time information 141. The time information 141 is used as a reference time of communication using the wireless signal processing unit 140. The wireless signal processing unit 150 holds time information 151. The time information 151 is used as a reference time of communication using the wireless signal processing unit 150. The link management unit 120 appropriately synchronizes the shared time information 122 with each piece of the time information 131, 141, and 151.

<1-3> Configuration of Terminal Apparatus 20

Figure 5:
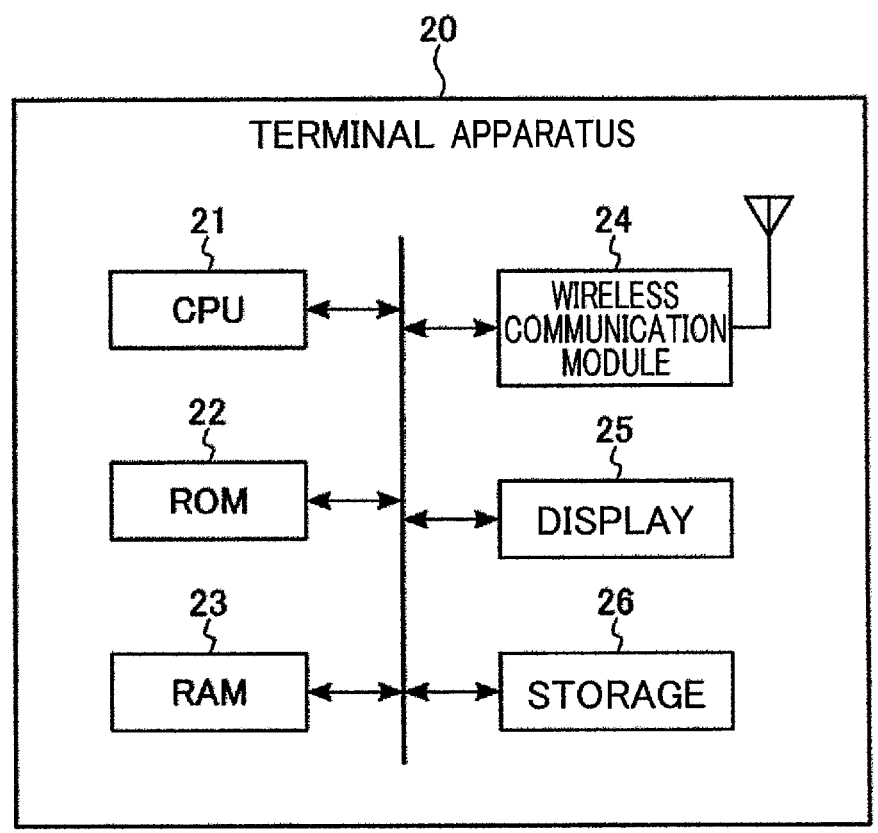
FIG. 5 is a block diagram showing an example of a configuration of a terminal apparatus included in the wireless system according to the embodiment.

FIG. 5 shows an example of a configuration of the terminal apparatus 20 included in the wireless system 1 according to the embodiment. As shown in FIG. 5, the terminal apparatus 20 includes, for example, a CPU 21, a ROM 22, a RAM 23, a wireless communication module 24, a display 25, and a storage 26.

The CPU 21 is a circuit that can execute various programs, and controls the overall operation of the terminal apparatus 20. The ROM 22 is a non-volatile semiconductor memory, and holds a program, control data, and the like for controlling the terminal apparatus 20. The RAM 23 is, for example, a volatile semiconductor memory and is used as a work region of the CPU 21. The wireless communication module 24 is a circuit used for transmitting and receiving data by a wireless signal, and is connected to an antenna. Also, the wireless communication module 24 includes, for example, a plurality of communication modules that respectively correspond to a plurality of frequency bands. The display 25 displays, for example, a Graphical User Interface (GUI) corresponding to application software. The display 25 may have a function of an input interface of the terminal apparatus 20. The storage 26 is a non-volatile storage device, and holds, for example, system software and the like of the terminal apparatus 20. The terminal apparatus 20 may not be provided with a display. For example, the display 25 can be omitted in the IoT terminal apparatus.

Figure 6:
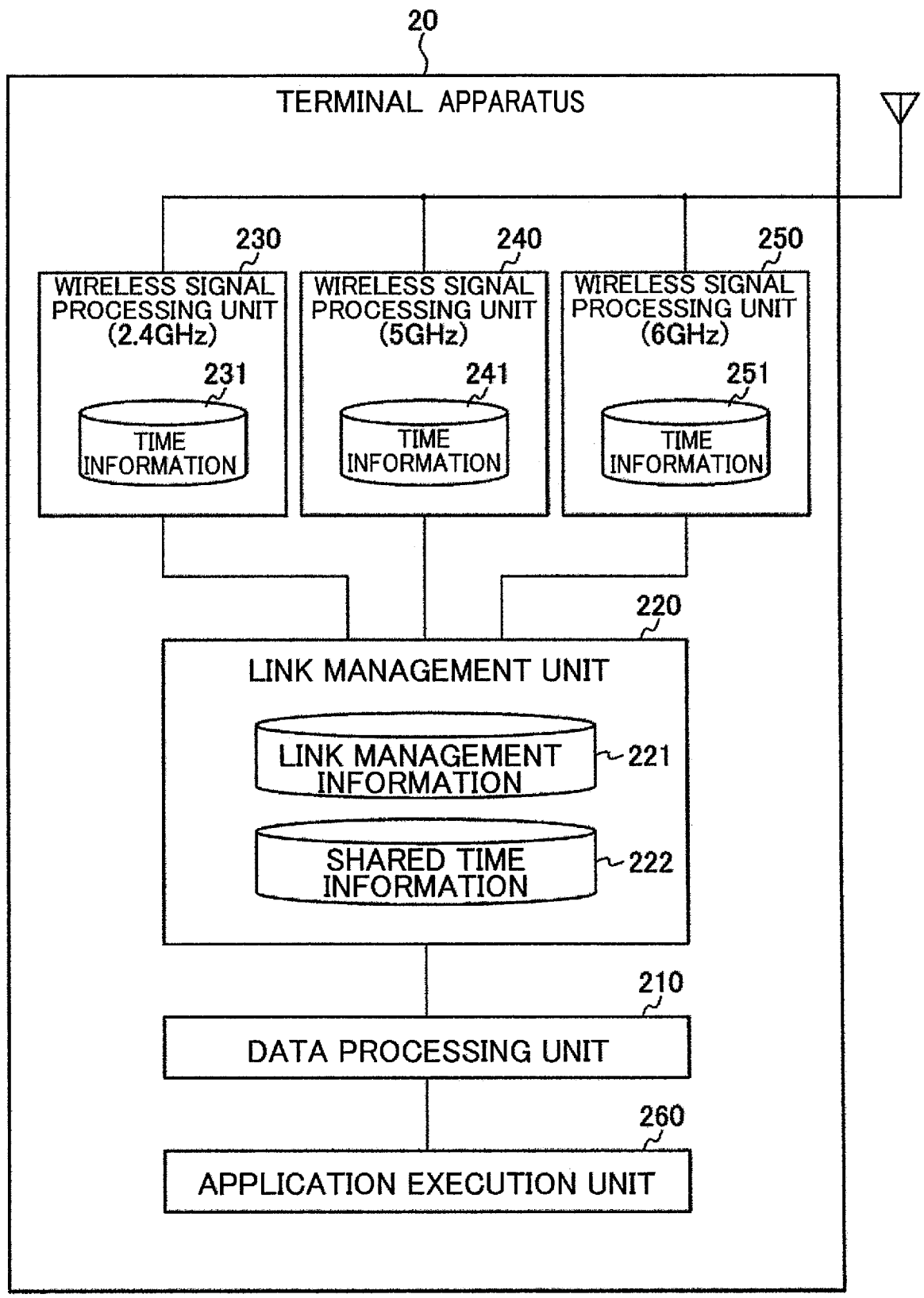
FIG. 6 is a block diagram showing an example of functions of the terminal apparatus included in the wireless system according to the embodiment.

FIG. 6 shows an example of a functional configuration of the terminal apparatus 20 included in the wireless system 1 according to the embodiment. As shown in FIG. 6, the terminal apparatus 20 includes, for example, a data processing unit 210, a link management unit 220, wireless signal processing units 230, 240, and 250, and an application execution unit 260. The processing of the data processing unit 210, the link management unit 220, and the wireless signal processing units 230, 240, and 250 is realized by, for example, the CPU 21 and the wireless communication module 24.

The data processing unit 210 can execute the processing of the LLC layer and the processing of the upper layer (the third layer to the seventh layer) on the input data. For example, the data processing unit 210 outputs the data input from the application execution unit 260 to the link management unit 220. Also, the data processing unit 210 outputs the data input from the link management unit 220 to the application execution unit 260.

The link management unit 220 can execute some of the processing of the MAC layer on the input data. Also, the link management unit 220 manages the link with the base station 10 based on notifications from the wireless signal processing units 230, 240, and 250. The link management unit 220 includes link management information 221 and shared time information 222. The link management information 221 is stored in, for example, the RAM 23, and includes information on the base station 10 to which the terminal apparatus 20 is connected. The shared time information 222 has time information shared in the terminal apparatus 20, and can be referred to by each of the wireless signal processing units 230, 240, and 250. The shared time information 222 corresponds to time information for synchronizing the multi-links.

Each of the wireless signal processing units 230, 240, and 250 performs transmission and reception of data between the base station 10 and the terminal apparatus 20 using wireless communication. For example, each of the wireless signal processing units 230, 240, and 250 adds a preamble, a PHY header, or the like to the data input from the link management unit 220 to create a wireless frame. Then, each of the wireless signal processing units 230, 240, and 250 converts the wireless frame into a wireless signal and distributes the wireless signal via the antenna of the terminal apparatus 20. Also, each of the wireless signal processing units 230, 240, and 250 converts the wireless signal received via the antenna of the terminal apparatus 20 into a wireless frame. Then, each of the wireless signal processing units 230, 240, and 250 outputs the data included in the wireless frame to the link management unit 220

In this way, each of the wireless signal processing units 230, 240, and 250 can execute, for example, some of the processing of the MAC layer and the processing of the first layer on the input data or the wireless signal. For example, the wireless signal processing unit 230 handles wireless signals in the 2.4 GHz band. The wireless signal processing unit 240 handles wireless signals in the 5 GHz band. The wireless signal processing unit 250 handles wireless signals in the 6 GHz band. The wireless signal processing units 230, 240, and 250 may or may not share the antenna of the terminal apparatus 20.

The wireless signal processing unit 230 holds time information 231. The time information 231 is used as a reference time of communication using the wireless signal processing unit 230. The wireless signal processing unit 240 holds time information 241. The time information 241 is used as a reference time of communication using the wireless signal processing unit 240. The wireless signal processing unit 250 holds time information 251. The time information 251 is used as a reference time of communication using the wireless signal processing unit 250. The link management unit 220 appropriately synchronizes the shared time information 222 with each piece of the time information 231, 241, and 251.

The application execution unit 260 executes an application that can use the data input from the data processing unit 210. For example, the application execution unit 260 can display information on the application on the display 25.

Also, the application execution unit 260 can operate based on operation of the input interface.

In the functional configuration of the wireless system 1 according to the embodiment described above, the wireless signal processing units 130, 140, and 150 of the base station 10 are configured to be able to connect to the wireless signal processing units 230, 240, and 250 of the terminal apparatus 20, respectively. That is, the wireless signal processing units 130 and 230 can be wirelessly connected using the 2.4 GHz band. The wireless signal processing units 140 and 240 can be wirelessly connected using the 5 GHz band. The wireless signal processing units 150 and 250 can be wirelessly connected using the 6 GHz band. In the present specification, each wireless signal processing unit may be referred to as an "STA function." That is, the wireless system 1 according to the embodiment includes a plurality of STA functions.

<1-4> Detailed Configuration of Link Management Unit

Figure 7:
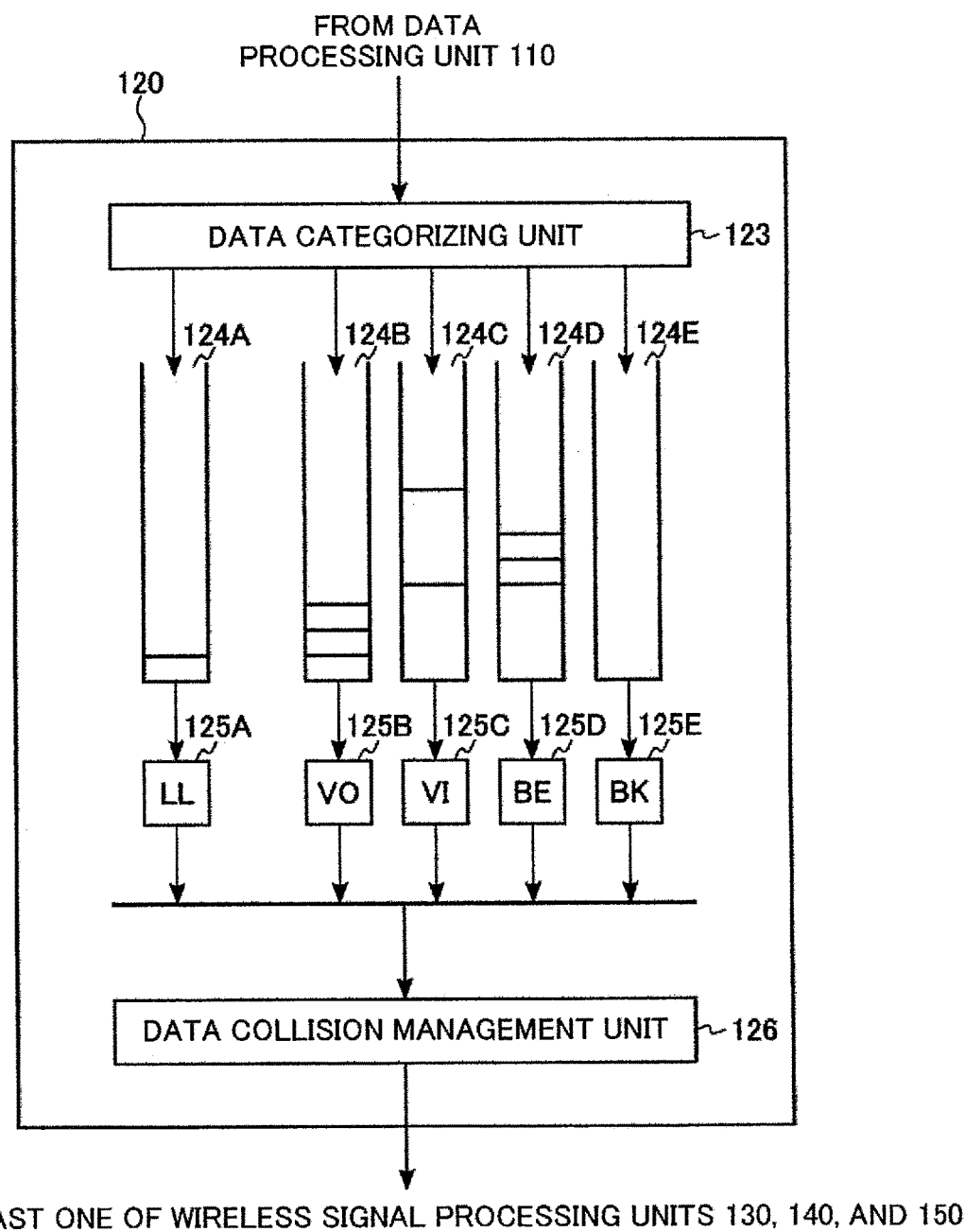
FIG. 7 is a block diagram showing an example of a detailed function of a link management unit of the base station included in the wireless system according to the embodiment.

FIG. 7 shows the details of a channel access function in the link management unit 120 of the base station 10 included in the wireless system 1 according to the embodiment. Since the function of the link management unit 220 of the terminal apparatus 20 is the same as that of the link management unit 120 of the base station 10, for example, the description thereof will be omitted. As shown in FIG. 7, the link management unit 120 includes, for example, a data categorizing unit 123, transmission queues 124A, 124B, 124C, 124D, and 124E, Carrier Sense Multiple Access with Collision Avoidance (CSMA/CA) execution units 125A, 125B, 125C, 125D, and 125E, and a data collision management unit 126.

The data categorizing unit 123 categorizes the data input from the data processing unit 110. As the category of data, for example, "Low Latency (LL)," "Voice (VO)," "Video (VI)," "Best Effort (BE)," and "Background (BE)" are set. The LL is applied to data requiring a low delay. Therefore, it is preferable that the data of the LL be processed preferentially to any of VO, VI, BE, and BK data.

Then, the data categorizing unit 123 inputs the categorized data to any of the transmission queues 124A, 124B, 124C, 124D, and 124E. Specifically, the data of the LL is inputted to the transmission queue 124A. The data of the VO is inputted to the transmission queue 124B. The data of the VI is inputted to the transmission queue 124C. The data of the BE is inputted to the transmission queue 124D. The data of the BK are inputted to the transmission queue 124E. Then, the inputted data of each category is accumulated in any of the corresponding transmission queues 124A to 124E.

In CSMA/CA, each of the CSMA/CA execution units 125A, 125B, 125C, 125D, and 125E waits for transmission for an amount of time defined by preset access parameters, while checking by carrier sense that no transmission of wireless signals is being performed by another terminal apparatus or the like. Then, CSMA/CA execution units 125A, 125B, 125C, 125D, and 125E extract data from the transmission queues 124A, 124B, 124C, 124D, and 124E, respectively, and output the extracted data to at least one of the wireless signal processing units 130, 140, and 150 via the data collision management unit 126. Then, the wireless signal including the data is transmitted by the wireless signal processing unit (STA function) for which a transmission right has been acquired by CSMA/CA.

The CSMA/CA execution unit 125A executes CSMA/CA for the data of the LL held in the transmission queue 124A. The CSMA/CA execution unit 125B executes CSMA/CA for the data of the VO held in the transmission queue 124B. The CSMA/CA execution unit 125C executes CSMA/CA for the data of the VI held in the transmission queue 124C. The CSMA/CA execution unit 125D executes CSMA/CA for the data of the BE held in the transmission queue 124D. The CSMA/CA execution unit 125D executes CSMA/CA for the data of the BK held in the transmission queue 124E.

The access parameters are assigned such that transmission of the wireless signals is prioritized in the order of LL, VO, VI, BE, and BK, for example. The access parameters include, for example, CWmin, CWmax, AIFS, and TXOPLimit. CWmin and CWmax indicate the minimum value and the maximum value of the contention window, which is a transmission waiting time for contention avoidance, respectively. Arbitration Inter Frame Space (AIFS) indicates a fixed transmission waiting time set for each access category for collision avoidance control provided with a priority control function. TXOPLimit indicates an upper limit value of Transmission Opportunity (TXOP) corresponding to the occupation time of the channel. For example, in the transmission queue 124, the shorter the CWmin and CWmax, the easier it is to obtain a transmission right. The priority of the transmission queue 124 becomes higher as the AIFS becomes smaller. The amount of data transmitted with one transmission right increases as the value of TXOP Limit increases.

The data collision management unit 126 prevents data collisions when a plurality of CSMA/CA execution units 125 acquire transmission rights by the same STA function. Specifically, the data collision management unit 126 adjusts transmission timing of data in which the transmission right is acquired by the same STA function in different categories, and transmits the data in the high priority category to the STA function. For example, the STA function for which the transmission right has been acquired by the CSMA/CA of the transmission queue 124A of the LL may be the same as the STA function for which the transmission right has been acquired by the CSMA/CA of any of the other transmission queues 124B to 124E. In this case, the data collision management unit 126 preferentially transmits the data stored in the transmission queue 124A to the STA function. Similarly, in the combination of the other transmission queues 124, data is transmitted in the order based on the priority set in the category. Thus, collision of data to which transmission is assigned to the same STA function is prevented.

In the present embodiment, the form in which the link management unit implements a channel access function is described, but each STA function may implement the channel access function. When the link management unit implements the channel access function, each STA function detects a state (idle/busy) of a wireless channel in a corresponding link, and the link management unit determines whether or not data can be transmitted (which link is used for transmission, etc.). On the other hand, when each STA function implements a channel access function, it is sufficient that each STA function independently executes carrier sense and transmits data. At this time, channel access when a plurality of links are simultaneously used may be executed by sharing access parameters by interaction between a plurality of STA functions, or may be executed by sharing access parameters by the link management unit. The base station 10 and the terminal apparatus 20 can simultaneously use a plurality of links by transmitting data based on an access parameter common between a plurality of STA functions.

<2> Operation of Wireless System 1

In the wireless system 1 according to the embodiment, a multi-link between the base station 10 and the terminal apparatus 20 can be established in response to a request from the base station 10 or the terminal apparatus 20. Hereinafter, in the wireless system 1 according to the embodiment, an example of the operation when the base station 10 and the terminal apparatus 20 have established the multi-link will be described.

FIG. 8 shows an example of the link management information 121 in the wireless system 1 according to the embodiment. Since the link management information 221 of the terminal apparatus 20 has information similar to the link management information 121 of the base station 10, description thereof is omitted. As shown in FIG. 8, the link management information 121 includes, for example, information on each of the STA function, frequency band, operation mode, link destination ID, presence/absence of a multi-link, and TID.

In this example, "STA1" corresponds to the STA function using the frequency band of 6 GHz, that is, the wireless signal processing unit 150 or 250. "STA2" corresponds to the STA function using the frequency band of 5 GHz, that is, the wireless signal processing unit 140 or 240. "STA3" corresponds to the STA function using the frequency band of 2.4 GHz, that is, the wireless signal processing unit 130 or 230.

The operation mode indicates the current operation mode of the STA function. The operation modes of the STA function include, for example, an active mode, an intermittent operation mode, and an operation pause mode. The active mode corresponds to a state in which the STA function of the terminal apparatus 20 maintains an Awake state, and thereby a wireless signal can be transmitted and received at any time. The intermittent operation mode corresponds to a state in which the STA function of the terminal apparatus 20 repeats an Awake state and a Doze state, hereby intermittently operating. The operation pause mode corresponds to a state in which the STA function of the terminal apparatus 20 maintains a Doze state, and thereby a wireless signal cannot be transmitted and received. The plurality of STA functions constituting the multi-link include a link in at least one active mode or intermittent operation mode. Other links constituting the multi-link may be set to any of an active mode, an intermittent operation mode, and an operation pause mode.

The Awake state corresponds to a state in which a wireless signal can be transmitted and received. The Doze state corresponds to a state in which a wireless signal cannot be transmitted and received. In the Doze state, the supply of power to the circuit related to the STA function is appropriately cut off. Therefore, the power consumption of the STA function becomes smaller in the order of the active mode, the intermittent operation mode, and the operation pause mode. Although the base station 10 or the terminal apparatus 20 can be used for communication, there may be a link which is not included in a link set of multi-links between the base station 10 and the terminal apparatus 20 (Disabled link, corresponding to "OFF" in FIG. 8). Hereinafter, in order to simplify the description, the link in the active mode or intermittent operation mode, that is, a communicable link is referred to as an "STA function in the Awake state." The link in the operation pause mode, that is, the link in the power saving state in which communication is not possible is referred to as an "STA function in the Doze state."

For example, the link destination ID corresponds to the identifier of the terminal apparatus 20 in the link management information 121, and corresponds to the identifier of the base station 10 in the link management information 221.

In this example, a multi-link using STA1 and STA2 has been established. When the multi-link is established, each of the link management units 120 and 220 transmits the data input from the upper layer using the link of at least one STA function associated with the multi-link.

"TID" in the link management information 121 indicates the association between the STA function and the TID information. Each STA function transmits and receives data corresponding to the assigned TID information. Each of TIDs #1 to 3 corresponds to any of LL, VO, VI, BE, and BK. One STA function may be associated with one traffic, that is, one TID, or a plurality of STA functions may be associated with each other. In this example, TID #1 is assigned to both STA1 and STA2. TID #2 is assigned to STAT. TID #3 is assigned to STA2.

The traffic flow corresponding to the association between such a traffic and the STA function is preset at the time of setting up the multi-link between the base station 10 and the terminal apparatus 20. For example, the link management unit 220 of the terminal apparatus 20 determines the association between the traffic and the STA function, and sends a request to the link management unit 120 of the base station 10. Then, the base station 10 confirms the association between the traffic and the STA function by responding to the request.

The traffic described above is set so as to be uniform among a plurality of links constituting a multi-link, for example. The present invention is not limited thereto, similar types of traffic (priority/non-priority, etc.) may be collected in one of the links constituting the multi-link. As the association between the STA function and the traffic, for example, audio is associated with a frequency band of 2.4 GHz and video is associated with 5 G. In this way, it is preferable to assign a frequency used for transmission and reception in accordance with the type of information to be handled and the data capacity.

Hereinafter, various operations when the base station 10 and the terminal apparatus 20 establish a multi-link will be described in order by paying attention to each of the base station 10 and the terminal apparatus 20.

2-1> Operation of Base Station 10

Data Transmission Method at Time of Multi-Link

Figure 9:
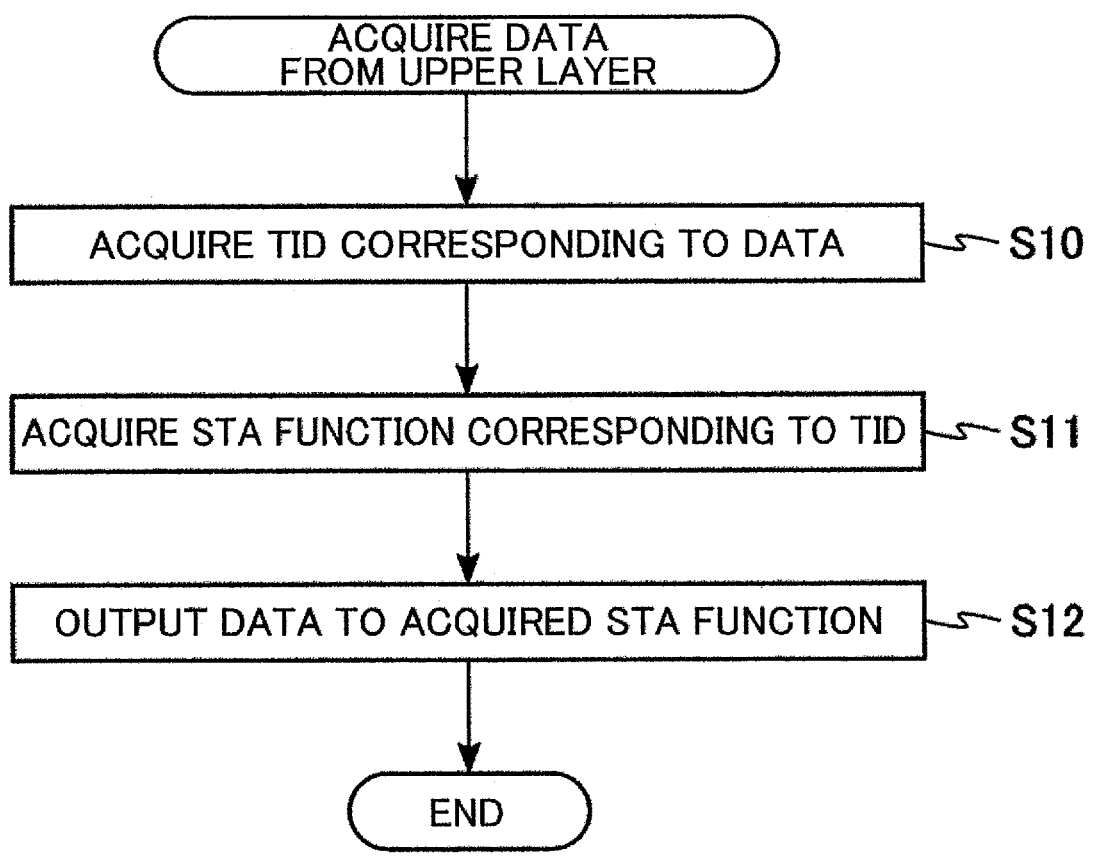
FIG. 9 is a flowchart showing an example of a data transmission method at the time of multi-link in the wireless system according to the embodiment.

FIG. 9 shows an example of a data transmission method at the time of multi-link in the base station 10 included in the wireless system 1 according to the embodiment. As shown in FIG. 9, when the base station 10 acquires data from the upper layer, the base station 10 sequentially executes the processes of steps S10 to S12.

Specifically, in the process of step S10, the link management unit 120 acquires TID information corresponding to the data. In other words, the link management unit 120 refers to the MAC header in the wireless frame acquired from the upper layer, for example, and checks whether the TID information included in the MAC header is any of LL, VO, VI, BE, and BK. Thus, the link management unit 120 can check which TID the traffic flow of the data corresponds to.

Next, in the process of step S11, a link management unit 120 acquires an STA function corresponding to the checked. TID information. At this time, the link management unit 120 checks association between the TID information and the STA function by referring to the link management information 121. In the process of step S11, the number of STA functions acquired by the link management unit 120 may be one or plural.

Next, in the process of step S12, the link management unit 120 outputs data to the acquired STA function. When one STA function is associated with the output data (traffic), the data is transmitted serially using one STA function. On the other hand, when a plurality of STA functions are associated with the traffic, the data is transmitted in parallel by using the plurality of STA functions.

When one traffic is transmitted in parallel, distribution and rearrangement of the data are executed between the link management unit 120 of the base station 10 and the link management unit 220 of the terminal apparatus 20. The distribution of the data is executed by the link management unit on the transmitting side, and the rearrangement of the data is executed by the link management unit on the receiving side. For example, the link management unit on the transmitting side adds a flag indicating that the wireless frame is multi-link and an identification number to the wireless frame. The link management unit on the receiving side executes rearrangement of data based on the added flag and identification number.

Further, in the wireless system 1 according to the embodiment, when a plurality of pieces of data are received from the upper layer, the link management unit may execute aggregation by combining the plurality of pieces of received data. Aggregation in the multi-link may be used as an option function that allows the user to select whether to execute.

Time Synchronization Method

In the wireless system 1 according to the embodiment, it is necessary to synchronize the time in the Basic Service Set (BSS) in order to execute CSMA/CA or the like. Therefore, the base station 10 appropriately transmits a beacon signal for time synchronization with the terminal apparatus 20 forming the link. Hereinafter, an example will be described in which the base station 10 transmits a beacon signal including time information when each STA function of the terminal apparatus 20 in which the multi-link is established is in the Awake state.

Figure 10:
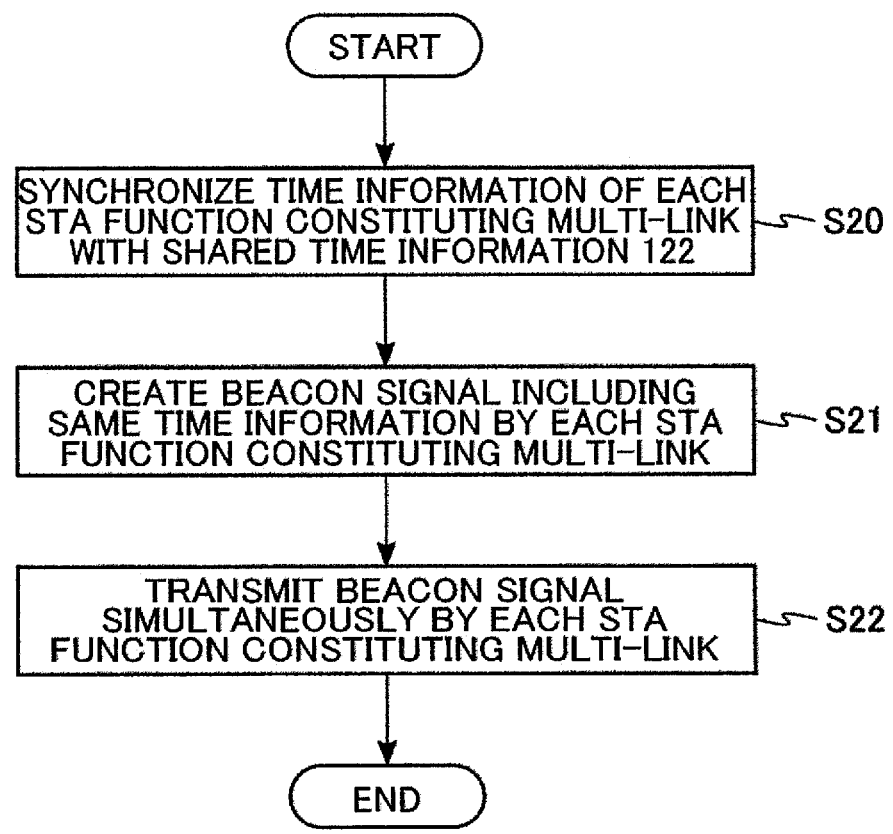
FIG. 10 is a flowchart showing an example of a time synchronization method in the wireless system according to the embodiment.

FIG. 10 shows an example of a time synchronization method in the base station 10 included in the wireless system 1 according to the embodiment. As shown in FIG. 10, the base station 10 sequentially executes the processes of steps S20 and S22 in order to synchronize time in the BSS.

Specifically, first, in the process of step S20, the time information of each STA function constituting the multi-link is synchronized with the shared time information 122. In other words, the link management unit 120 transmits the shared time information 122 to, for example, each STA functions (wireless signal processing units 130, 140 and 150). Then, the shared time information 122 is overwritten on each piece of the time information 131 in the wireless signal processing unit 130, the time information 141 in the wireless signal processing unit 140, and the time information 151 in the wireless signal processing unit 150.

Next, in the process of step S21, each STA function constituting the multi-link creates a beacon signal including the same time information. Specifically, the wireless signal processing units 130, 140, and 150 respectively create beacon signals including time information 131, 141, and 151. The time information 131, 141, and 151 include the same time information by the process in step S20. The link management unit 120 may create a beacon signal including the same time information and provide the created beacon signal to each STA function.

Next, in the process of step S22, each STA function constituting the multi-link simultaneously transmits a beacon signal. Each STA function can transmit a beacon signal, for example, when it is in the Awake state of the active mode or when it is in the Awake state of the intermittent operation mode. On the other hand, each STA function cannot transmit a beacon signal when it is in the Disable state or when it is in the Doze state of the intermittent operation mode. In the present embodiment, the beacon signals including the same time information are simultaneously transmitted from each STA function, but the present invention is not limited thereto. For example, beacon signals including time information shared by each STA function may be transmitted at different times. In other words, it is sufficient that the time information to be handled among the plurality of STA functions constituting the multi-link is synchronized, and the time information of the beacon signal is generated based on the synchronized time information.

The beacon signal including the time information transmitted by the base station 10 as described above can be received by the terminal apparatus 20. The terminal apparatus 20 uses the STA function in the Awake state to receive the beacon signal. Then, the link management unit 220 of the terminal apparatus 20 overwrites the time information included in the received beacon signal on the shared time information 222. That is, the time information included in the beacon signal and the shared time information 222 of the terminal apparatus 20 are synchronized with each other. In addition, the time information of the STA function used for receiving the beacon signal at this time is also synchronized with the time information included in the beacon signal. When it is necessary to compensate for the offset of the time information due to the physical distance between the base station 10 and the terminal apparatus 20, the STA function in the Awake state of the terminal apparatus 20 performs Fine Timing Management, adds an offset to the time information of the received beacon signal, and overwrites the added information on the shared time information. Thus, the STA function that has shifted from the Doze state to the Awake state can use the time information with the offset added by using the shared time information. Here, Fine Timing Management is a highly accurate timing management defined by IEEE 802.11-2016. By adding the offset by Fine Timing Management, even when the terminal apparatus 20 moves during the Doze state, the STA function shifts to the Awake state and can quickly achieve a highly accurate synchronization.

Since the multi-link includes at least one STA function in the Awake state, the synchronization of the time information described above can be executed even when the multi-link includes the STA function in the Doze state. In addition, the terminal apparatus 20 may receive a beacon including the time information by a plurality of STA functions constituting a multi-link. In this case, the time information of the STA function that has received the beacon signal is synchronized, and the shared time information 222 is updated based on the beacon signal received by any of the STA functions. At this time, the STA function used for updating the shared time information 222 is selected, for example, based on the priority set for each STA function.

Figure 11:
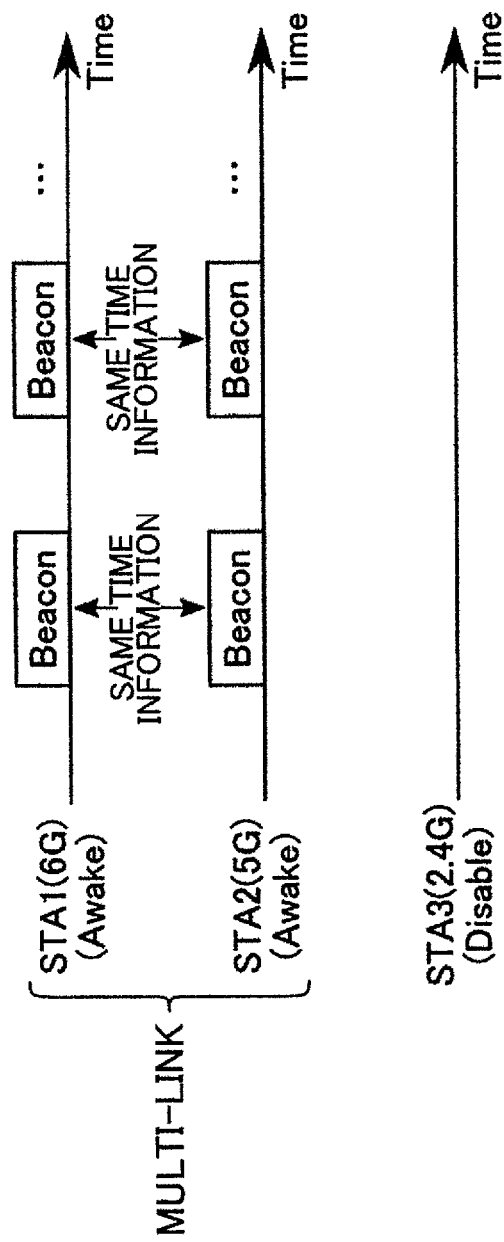
FIG. 11 is a conceptual diagram showing an example of a beacon signal output method in the base station included in the wireless system according to the embodiment.

FIG. 11 shows an example of a beacon signal output method in the base station 10 included in the wireless system 1 according to the embodiment, and corresponds to the operation described with reference to FIG. 10. In this example, STA1 and STA2 have established multi-link. Then, each of STA1 and STA2 is set to the Awake state, and STA3 is set to the Disable state ("OFF").

As shown in FIG. 11, each of STA1 and STA2 constituting the multi-link intermittently transmits a beacon signal. On the other hand, the transmission of the beacon signal by STA3 in the Disable state is omitted. The beacon signals transmitted at the same time by each of STA1 and STA2 include the same time information (reference time information). Specifically, the time information 131 included in the beacon signal transmitted by STA1 and the time information 141 included in the beacon signal transmitted by the STA 2 include the same time information synchronized with the shared time information 122.

Buffer Status Notification Method

When the multi-link includes a link in the operation pause mode (STA function in the Dose state), the base station 10 in the embodiment appropriately transmits a beacon signal notifying of the data buffer status to the terminal apparatus 20. FIG. 12 shows an example of the link management information 121 in the wireless system 1 according to the embodiment. The link management information 121 shown in FIG. 12 has information in which the operation mode of STA1 is changed to the intermittent operation mode (Awake state) and the operation mode of STA2 is changed to the operation pause mode (Doze state) in the link management information 121 shown in FIG. 8. An example in which the base station 10 constituting the multi-link shown in FIG. 12 transmits a beacon signal related to the notification of the buffer status will be described below.

Figure 13:
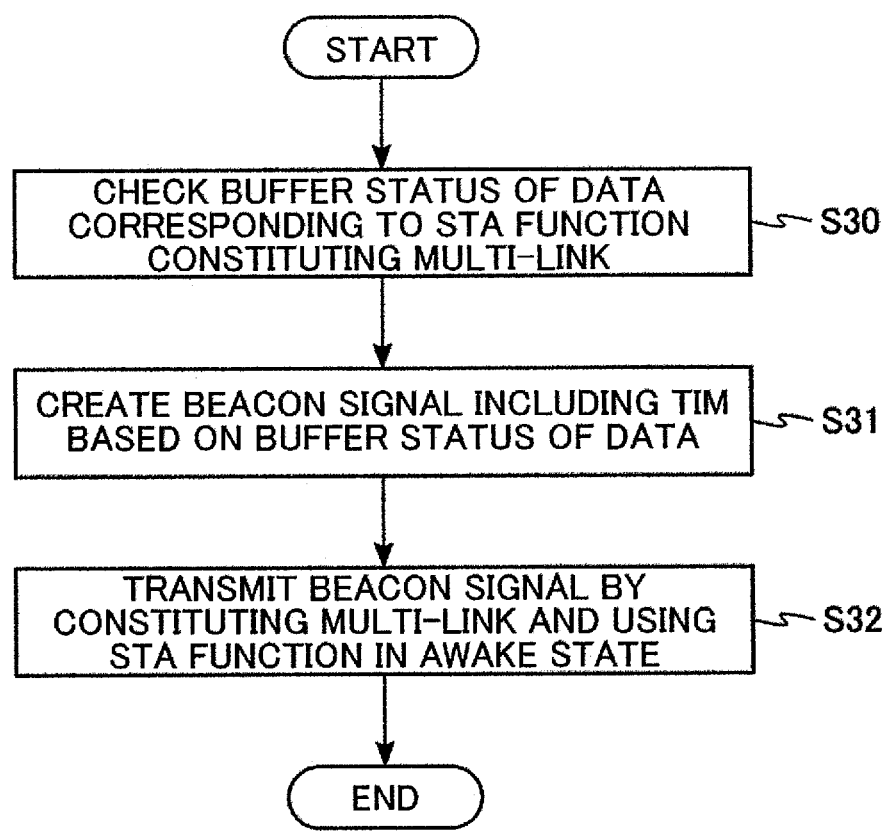
FIG. 13 is a flowchart showing an example of a buffer notification method in the base station included in the wireless system according to the embodiment.

FIG. 13 shows an example of a buffer status notification method in the base station 10 included in the wireless system 1 according to the embodiment. As shown in FIG. 13, the base station 10 sequentially executes the processes of steps S30 and S32 in order to notify the terminal apparatus of the buffer status.

Specifically, first, in the process of step S30, the link management unit 120 checks a buffer status of data corresponding to the STA function constituting the multi-link. In other words, the link management unit 120 checks whether or not data is accumulated in the plurality of transmission queues 124 corresponding to, for example, TID #1 to TID #3, respectively.

Next, in the process of step S31, a beacon signal including a Traffic Indication Map (TIM) is created based on the buffer status of the data. The TIM is an information element for notifying the terminal apparatus 20 during power saving of arrival of data. The creation of the beacon signal may be executed by the link management unit 120 or by each STA function. A specific example of the format of the beacon signal including the TIM will be described later.

Next, in the process of step S32, the beacon signal is transmitted by constituting the multi-link and using the STA function in the Awake state. In other words, when the multi-link includes the STA function in the Doze state, the base station 10 transmits the beacon signal created in step S31 by using at least one STA function in the Awake state among the STA functions establishing the multi-link. In this example, the base station 10 uses STA1 for transmission of the beacon signal.

Figure 14:
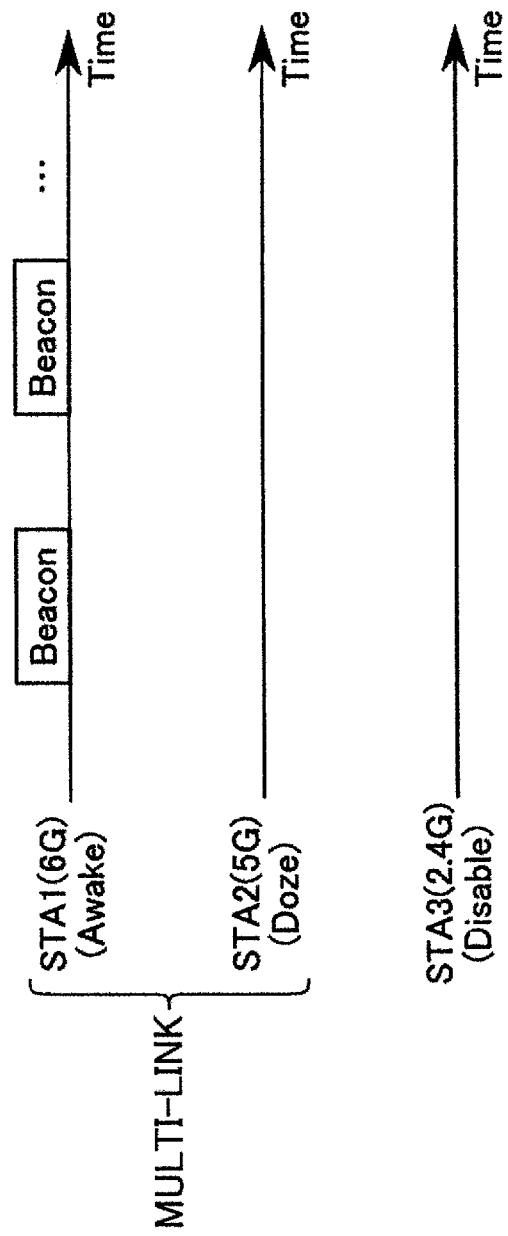
FIG. 14 is a conceptual diagram showing an example of a beacon signal output method in the base station included in the wireless system according to the embodiment.

FIG. 14 shows an example of a beacon signal output method in the base station 10 included in the wireless system 1 according to the embodiment, and corresponds to the operation described with reference to FIG. 13. That is, in this example, STA1 and STA2 establish a multi-link, and STA1 and STA2 are set to the Awake state and the Doze state, respectively. Further, STA3 is set to the Disable state.

As shown in FIG. 14, out of STA1 and STA2 constituting the multi-link, STA1 in the Awake state intermittently transmits the beacon signal. On the other hand, the transmission of the beacon signal by each of STA2 in the Doze state and STA3 in the Disable state is omitted.

FIG. 15 shows a specific example of a beacon signal including a TIM corresponding to the multi-link shown in FIG. 12 in the wireless system 1 according to the embodiment. As shown in FIG. 15, the beacon signal includes, for example, a terminal apparatus identifier, a link identifier #1, buffer information #1, a link identifier #2, and buffer information #2 in this order.

The terminal apparatus identifier includes, for example, an association identifier AID (Association Identifier) between the base station 10 and the terminal apparatus 20. The link identifiers #1 and #2 include one and the other link identifiers constituting the multi-link, respectively. The buffer statuses #1 and #2 indicate the traffic buffer statuses corresponding to the link identifiers #1 and #2, respectively. For example, when the buffer status is "0," it indicates that no traffic for the associated link identifier has been accumulated. When the buffer status is "1," it indicates that the traffic for the associated link identifier has been accumulated. The assignment of the bit indicating the buffer status and the presence or absence of the accumulation of traffic can be freely changed.

As described above, in the wireless system 1 according to the embodiment, the base station 10 can transmit, to the terminal apparatus 20, the beacon signal including information indicating whether or not traffic is accumulated for each link establishing a multi-link. Then, the beacon signal for notifying of the buffer status includes the buffer status of the STA function corresponding to the STA function forming the link regardless of whether the STA function is in the Awake state or the Doze state.

The header of the beacon signal includes information indicating how many STA function buffer status information is included in the beacon signal. When the multi-link is established by three or more. STA functions, the beacon signal may include three or more sets of a link identifier and a buffer status corresponding to the link identifier. The beacon signal may or may not include information on an unestablished link.

<2-2> Operation of Terminal Apparatus 20

The terminal apparatus 20 in the embodiment applies an operation pause mode to some of links constituting a multi-link according to a communication status. Hereinafter, the state of the multi-link including the link in the operation pause mode (Doze state) is referred to as "multi-link power save (multi-link power saving)," and an example of various operations related to the multi-link power saving of the terminal apparatus 20 will be described. Also, in the following description, it is assumed that a multi-link using STA1 and STA2 is established between the base station and the terminal apparatus 20. Further, in order to simplify the description, STA1 and STA2 of the base station are also referred to as an "access point AP." The transmission of the wireless signal to the access point AP by STA1 and SA2 of the terminal apparatus 20 corresponds to the transmission of the wireless signal to STA1 and STA2 of the base station 10, respectively. When STA1 and STA2 are individually described, they indicate the STA function of the terminal apparatus 20.

Method of Starting Multi-Link Power Saving

Figure 16:
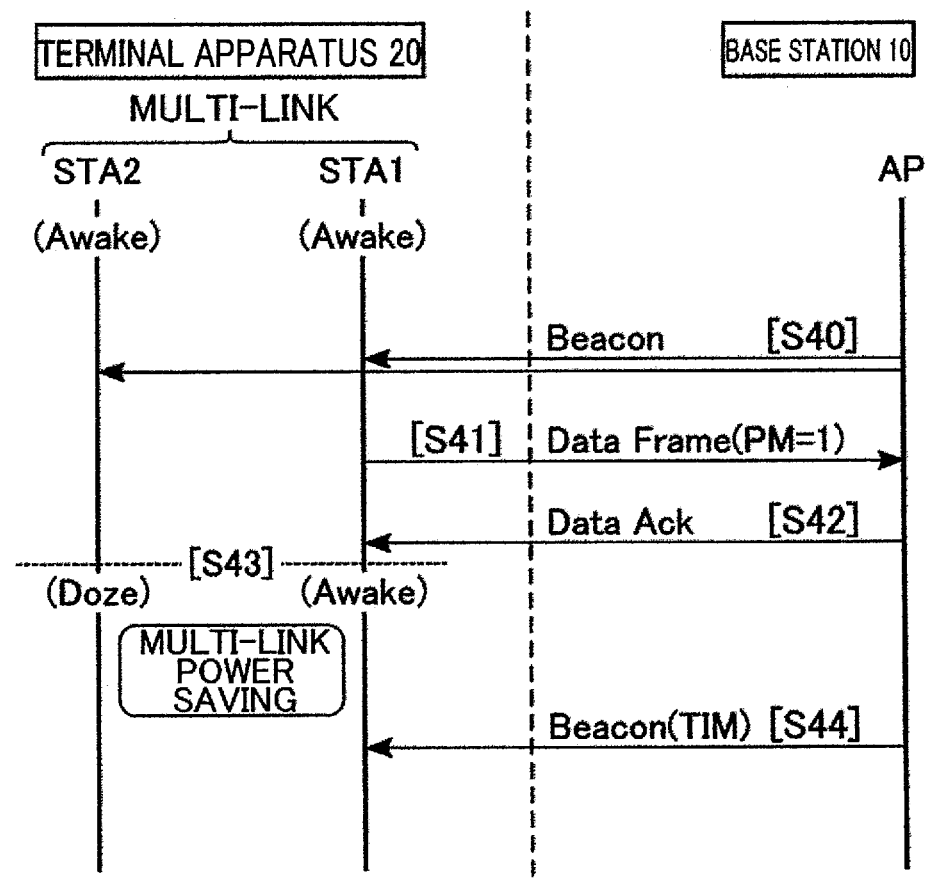
FIG. 16 is a flowchart showing an example of a method of starting multi-link power saving in the wireless system according to the embodiment.

FIG. 16 is a flowchart showing an example of a method of starting multi-link power saving in the wireless system 1 according to the embodiment. At the start of this operation, each of STA1 and STA2 is in the Awake state. As shown in FIG. 16, the access point AP transmits a beacon signal to each of STA1 and STA2 of the terminal apparatus (step S40). The beacon signal includes, for example, information indicating that each traffic of STA1 and STA2 is empty, and is received by each of STA1 and STA2.

STA1 of the terminal apparatus 20 transmits a wireless signal for notifying of the start of multi-link power saving to the access point AP in response to, for example, the empty traffic (step S41). The data frame of the wireless signal notifying of the start of the multi-link power saving includes, for example, a Power Management (PM) bit in which "1" is stored. The access point AP that has received the signal of "PM=1" transmits a wireless signal (Data ACK) notifying the terminal apparatus 20 that the signal has been received to STA1 of the terminal apparatus 20 (step S42).

When STA1 of the terminal apparatus 20 receives a Data ACK indicating that a data frame including "PM=1" is transmitted, the link management unit 220 of the terminal apparatus 20 transitions, for example, STA2 from the active mode or the intermittent operation mode (Awake state) to the operation pause mode (Doze state) (step S43). Thus, the total power consumption of STA1 and STA2 constituting the multi-link becomes lower than that before the use of the operation pause mode. In the process of step S43, it is sufficient that at least one STA function set in the Doze state exists in the plurality of STA functions constituting the multi-link.

After transmitting the Data ACK indicating that "PM=1" is received, the access point AP transmits the beacon signal including the TIM to STA1 of the terminal apparatus 20 (step S44). At this time, STA1 in the Awake state can receive the beacon signal. On the other hand, STA2 in the Doze state does not receive the beacon signal and maintains a state of power consumption lower than that of STA1.

As described above, the terminal apparatus 20 in the wireless system 1 according to the embodiment transitions to the multi-link power saving according to the traffic state, and thus the power consumption of the multi-link can be suppressed. Then, the base station 10 intermittently transmits a beacon signal including a TIM for notifying of the buffer status of the data to the STA function of the terminal apparatus 20 in the Awake state based on the transition of the terminal apparatus 20 to the multi-link power saving. Details of the communication method between the base station 10 and the terminal apparatus 20 during multi-link power saving will be described later.

Method of Ending Multi-Link Power Saving

Figure 17:
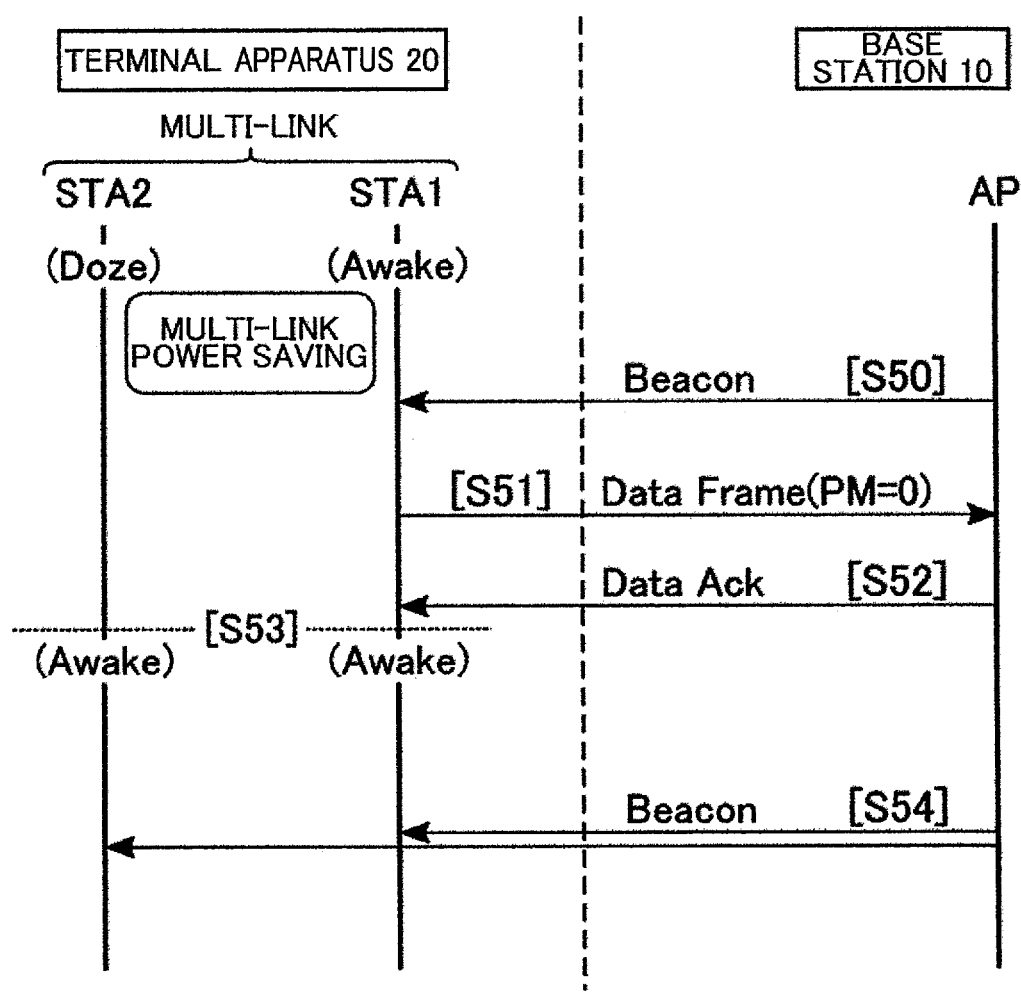
FIG. 17 is a flowchart showing an example of a method of ending multi-link power saving in the wireless system according to the embodiment.

FIG. 17 shows an example of the flow of a method of ending multi-link power saving in the wireless system 1 according to the embodiment. At the start of this operation, STA1 and STA2 are in the Awake state and the Doze state, respectively. As shown in FIG. 17, the access point AP transmits a beacon signal to each of STA1 and STA2 of the terminal apparatus 20 (step S50). This beacon signal includes, for example, information requesting the terminal apparatus 20 to end the multi-link power saving, and is received by the STA1 in the Awake state. STA1 of the terminal apparatus 20 transmits a wireless signal notifying of the end of the multi-link power saving to the access point AP in response to receiving the beacon signal (step S51). The data frame of the wireless signal notifying of the end of the multi-link power saving includes, a PM bit in which, for example, "0" is stored. The access point AP that has received the signal of "PM=0" transmits a wireless signal (Data ACK) notifying the terminal apparatus 20 that the signal has been received to STA1 of the terminal apparatus 20 (step S52).

When STA1 of the terminal apparatus 20 receives a Data ACK indicating that a data frame including "PM=0" is transmitted, the link management unit 220 of the terminal apparatus 20 transitions STA2 from the operation pause mode (Doze state) to the active mode or the intermittent operation mode (Awake state) (step S53). Thus, each of STA1 and STA2 constituting the multi-link becomes a state capable of receiving a wireless signal from the base station 10.

After transmitting the Data ACK indicating that "PM=0" is received, the access point AP transmits the beacon signal to each of STA1 and STA2 of the terminal apparatus 20 (step S54). The beacon signal includes various information elements required for communication.

As described above, the base station 10 in the wireless system 1 according to the embodiment can transition the STA function set in the operation pause mode in the multi-link to the active mode or the intermittent operation mode as needed, and set a plurality of STA functions constituting the multi-link to a communicable state. In the above description, the case where the STA function in the Doze state transitions to the Awake state based on the beacon signal of the base station 10 has been illustrated, but the present invention is not limited thereto. The terminal apparatus 20 may transition the STA function in the Doze state to the Awake state based on the operation of the user or the control of the application.

Operation During Multi-Link Power Saving

Figure 18:
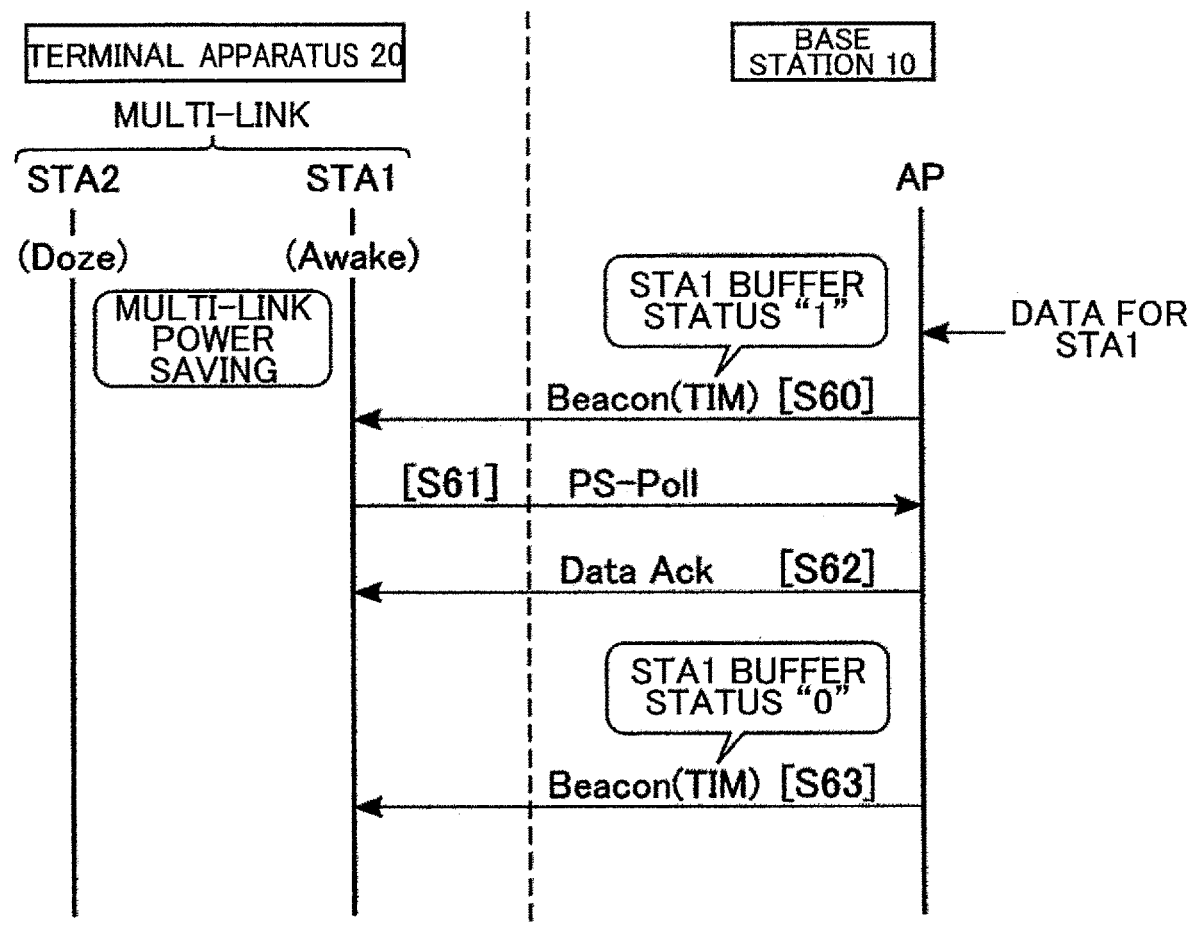
FIG. 18 is a flowchart showing an example of a communication method at the time of multi-link power saving in the wireless system according to the embodiment.
Figure 19:
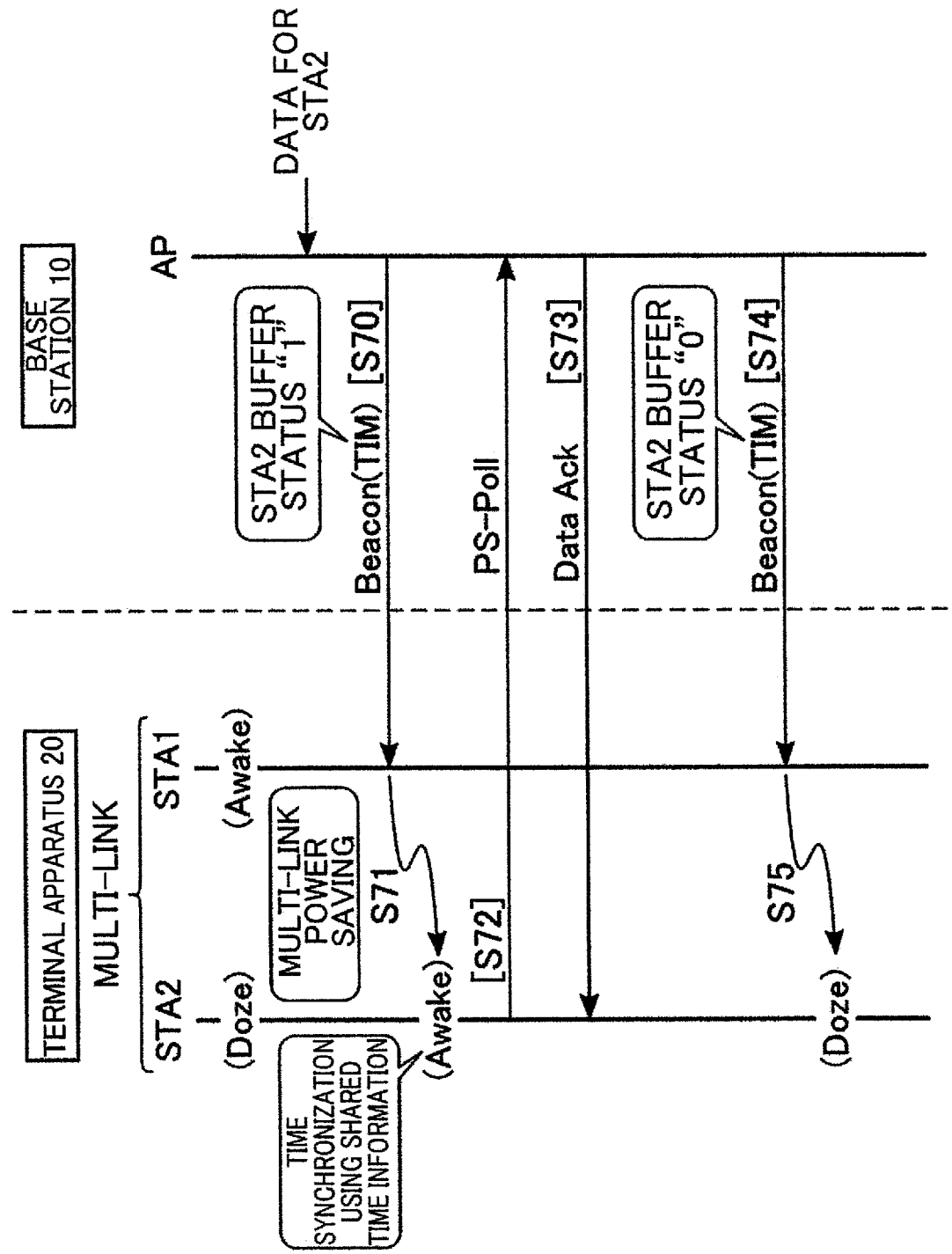
FIG. 19 is a flowchart showing an example of a communication method at the time of multi-link power saving in the wireless system according to the embodiment.

FIGS. 18 and 19 show an example of the flow of an operation during multi-link power saving in the wireless system 1 according to the embodiment. FIG. 18 corresponds to the operation when the access point AP receives data for STA1 in the Awake state. FIG. 19 corresponds to the operation when the access point AP receives data for STA2 in the Doze state.

First, an example of the operation of the wireless system 1 when the access point AP receives the data for STA1 in the Awake state will be described. As shown in FIG. 18, when the access point AP receives the data for STA1 of the terminal apparatus 20, the access point AP accumulates the data in the transmission queue 124 of the link management unit 120, for example. Then, the access point AP transmits a beacon signal including a TIM indicating that the buffer status of the data for STA1 is "1" to STA1 in the Awake state (step S60).

The beacon signal received by STA1 of the terminal apparatus 20 is transferred to the link management unit 220. Then, the link management unit 220 transmits a Power Save-Poll (PS-Poll) frame requesting transmission of the data for STA1 to the access point AP via STA1 based on the beacon signal (step S61). When the access point AP receives the PS-Poll frame from STA1 of the terminal apparatus 20, the access point AP transmits a Data ACK including the data accumulated for the corresponding STA1 to STA1 of the terminal apparatus 20 (step S62). Thus, STA1 of the terminal apparatus 20 can receive data for its own station accumulated in the access point AP.

When the transmission of data for STA1 is completed and the accumulation of data for STA1 in the transmission queue 124 is eliminated, the access point AP transmits a beacon signal including a TIM indicating that the buffer status of the data for STA1 is "0" to STA1 of the terminal apparatus 20 (step S63). That is, the access point AP notifies the link management unit 220 of the terminal apparatus 20 of the completion of the transmission of the data for STA1 via STA1.

Next, an example of the operation of the wireless system 1 when the access point AP receives the data for STA2 in the Doze state will be described. As shown in FIG. 19, when the access point AP receives the data for STA2 of the terminal apparatus 20, the access point AP accumulates the data in the transmission queue 124 of the link management unit 120, for example. Then, the access point AP transmits a beacon signal including a TIM indicating that the buffer status of the data for STA2 is "1" to STA1 in the Awake state (step S70).

The beacon signal received by STA1 of the terminal apparatus 20 is transferred to the link management unit 220. Then, the link management unit 220 transitions STA2 from the Doze state to the Awake state based on the beacon signal (step S71). Then, STA2 that has transitioned to the Awake state first refers to the shared time information 222, and synchronizes the time information 241 corresponding to STA2 with the shared time information 222.

Thereafter, the link management unit 220 transmits a Power Save-Poll (PS-Poll) frame requesting transmission of the data for STA2 to the access point AP via STA2 (step S72). When the access point AP receives the PS-Poll frame from STA2 of the terminal apparatus 20, the access point AP transmits a Data ACK including the data accumulated for STA2 to STA2 of the terminal apparatus 20 (step S73). Thus, STA2 of the terminal apparatus 20 can receive data for its own station accumulated in the access point AP.

When the transmission of data for STA2 is completed and the accumulation of data for STA2 in the transmission queue 124 is eliminated, the access point AP transmits a beacon signal including a TIM indicating that the buffer status of STA2 is "0" to STA1 of the terminal apparatus 20 (step S74). That is, the access point AP notifies the link management unit 220 of the terminal apparatus 20 of the completion of the transmission of the data for STA2 via STA1. The beacon signal may be received by STA2. Then, the link management unit 220 transitions STA2 from the Awake state to the Doze state based on the beacon signal (step S75). That is, based on the completion of transmission of the data, the STA function that is not used for receiving the beacon signal among the STA functions constituting the multi-link is set to a power-saving Doze state again.

As described above, the base station 10 in the wireless system 1 according to the embodiment can transmit data to the terminal apparatus 20 using the multi-link power saving. In the above description, the case where data is transmitted for each STA function has been illustrated, but data may be transmitted in parallel to each of a plurality of STA functions constituting a multi-link. For example, when the buffer status of each of STA1 and STA2 is "1," the link management unit 220 of the terminal apparatus 20 may instruct each of STA1 and STA2 to transmit the PS-Poll frame to the access point AP.

<3> Effect of Embodiment

With the wireless system 1 according to the embodiment described above, the power consumption of the terminal apparatus 20 at the time of multi-link can be suppressed. The details of the effect of the wireless system 1 according to the embodiment will be described below.

A base station and a terminal apparatus using a wireless LAN may have a plurality of STA functions provided for each band used, for example, 2.4 GHz, 5 GHz, and 6 GHz, in some cases. In such a wireless system, for example, by selecting one STA function among a plurality of STA functions, a wireless connection is established and data communication between the base station and the terminal apparatus is performed. At this time, in the wireless system, the unselected STA function is not used even if there is a base station corresponding to the band of the STA function.

On the other hand, the wireless system 1 according to the embodiment utilizes a plurality of STA functions provided in each of the base station 10 and the terminal apparatus 20 to establish a multi-link between the base station 10 and the terminal apparatus 20. In data communication through a multi-link, a plurality of bands can be used together, and the functions of the wireless LAN device can be fully utilized. As a result, the wireless system 1 according to the embodiment can realize efficient communication and can improve the communication speed. On the other hand, since a plurality of STA functions are used in each of the base station 10 and the terminal apparatus 20, the power consumption of the multi-link is higher than that of the single link.

Therefore, the wireless system 1 according to the embodiment sets the multi-link to the multi-link power saving when traffic is small or the like. In the multi-link power saving, for example, at least one STA function among a plurality of STA functions constituting the multi-link is set to the normal state (Awake state), and the other STA functions are set to the power saving state (Doze state). The STA function in the Awake state can receive, for example, the beacon signal of the base station 10. Further, the STA function in the Doze state is stopped as in the Disable state, for example. Therefore, the power consumption of the STA function in the Doze state is lower than that of the STA function in the Awake state.

Then, in the multi-link power saving, the STA function in the Awake state receives a beacon signal including information corresponding to a plurality of STA functions constituting the multi-link. For example, when data for the STA function in the Doze state is input to the base station 10 from the network NW, the base station 10 notifies the terminal apparatus 20 that data has been accumulated via the STA function (link) in the Awake state. Then, the STA function of the terminal apparatus 20 transfers the notification to the link management unit 220, and the link management unit 220 wakes up the STA function in the Doze state. Thus, the waked-up STA function can acquire data from the base station 10 by transmitting the PS-Poll frame.

In the wireless system 1 according to the embodiment, in order to execute CSMA/CA or the like, it is necessary that the time information of the STA function of the base station 10 forming the link and the time information of the STA function of the terminal apparatus 20 are synchronized with each other. For example, when a single link is used, it is sufficient that the STA function of the base station 10 and the STA function of the terminal apparatus 20 is time-synchronized at least for each link, and the time information may be different between different links.

On the other hand, when a multi-link is used, it is necessary to synchronize time between STA functions constituting the multi-link. In other words, in the multi-link, it is necessary to operate in synchronization with different frequencies. Time synchronization in the BSS is performed by receiving a beacon signal. For example, in the multi-link, even when the multi-link power saving is applied, the STA function set in the active mode or the intermittent operation mode (Awake state) can receive the beacon and perform time synchronization.

However, in the STA function set to the Doze state in the multi-link power saving, there is a concern that the time synchronization of the link is shifted with the lapse of time. Specifically, since the STA function in the Doze state cannot perform time synchronization by the beacon signal, a deviation in time information may occur in accordance with variations in accuracy of a clock referred to by the STA function. Therefore, when transmitting and receiving data by the STA function in the Doze state, it is preferable that the terminal apparatus 20 execute time synchronization of the STA function after waking up.

Therefore, in the wireless system 1 according to the embodiment, each of the base station 10 and the terminal apparatus 20 has a local clock common to all STA functions, that is, shared time information. Then, the base station 10 synchronously transmits a beacon signal including the shared time information in all links constituting, for example, a multi-link. Then, the STA function in the Awake state receives the beacon signal and updates the shared time information when the time stamps of the beacon signal and the local clock are different.

In this way, the synchronization of the shared time information is sequentially executed by using the STA function in the Awake state. On the other hand, the STA function in the Doze state uses a common local clock to execute time synchronization on the link when it wakes up. That is, the STA function in the Doze state can execute time synchronization in the multi-link without receiving the beacon signal after wake-up.

As described above, in the wireless system 1 according to the embodiment, the clock for time synchronization in multi-link is shared by each of the base station 10 and the terminal apparatus 20. Thus, the terminal apparatus 20 can synchronize time between a plurality of STA functions constituting a multi-link while omitting time synchronization for each STA function using the beacon signal. As a result, the wireless system 1 according to the embodiment can quickly transmit and receive data after waking up the STA function in the Doze state while suppressing power consumption of the terminal apparatus 20.

<4> Modification Example of Embodiment

The wireless system 1 described in the embodiment is merely an example, and various modifications are possible. First, second, and third modification examples of the embodiment will be described in order below.

<4-1> First Modification Example

Figure 20:
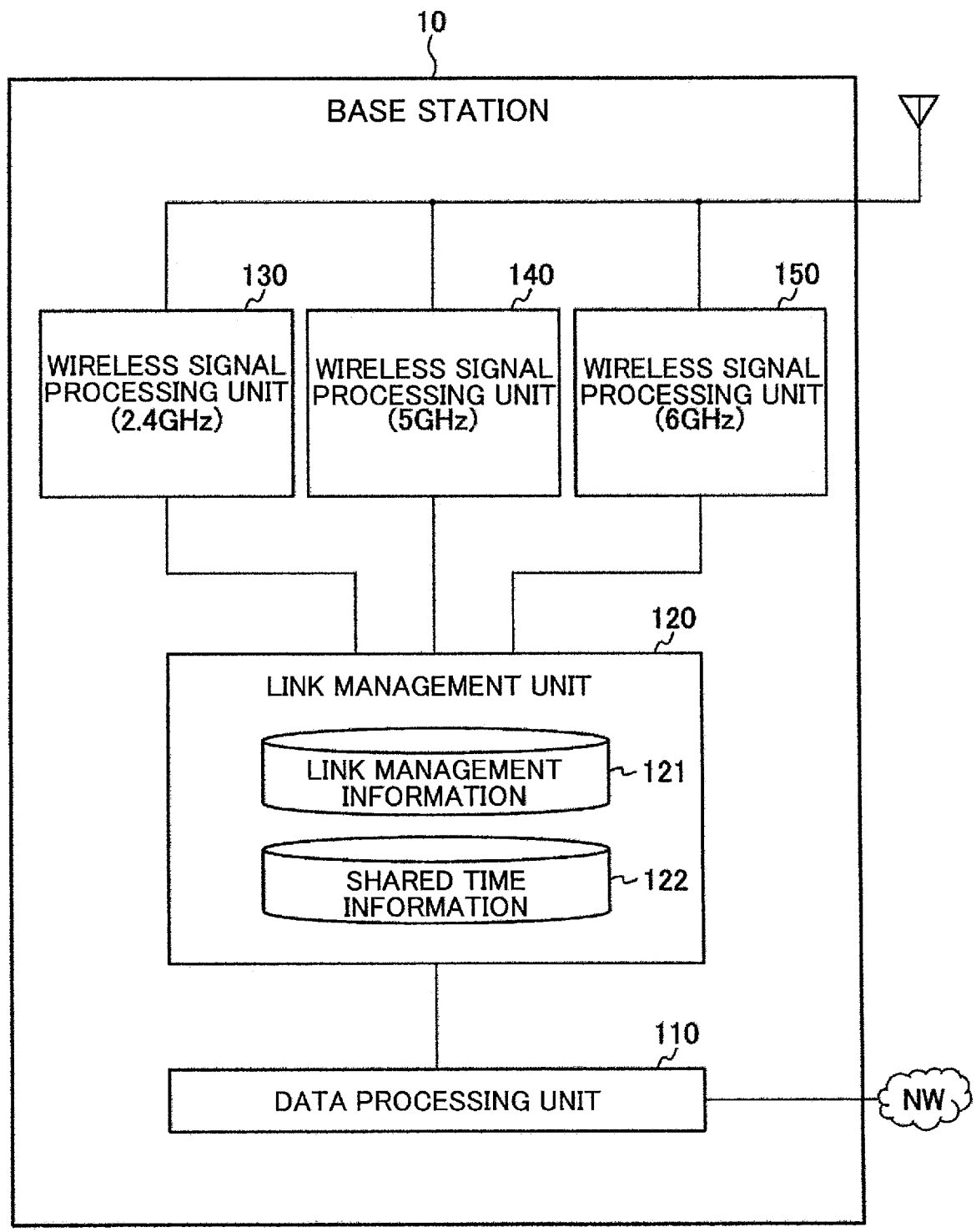
FIG. 20 is a block diagram showing an example of functions of a base station included in a wireless system according to a first modification example of the embodiment.
Figure 21:
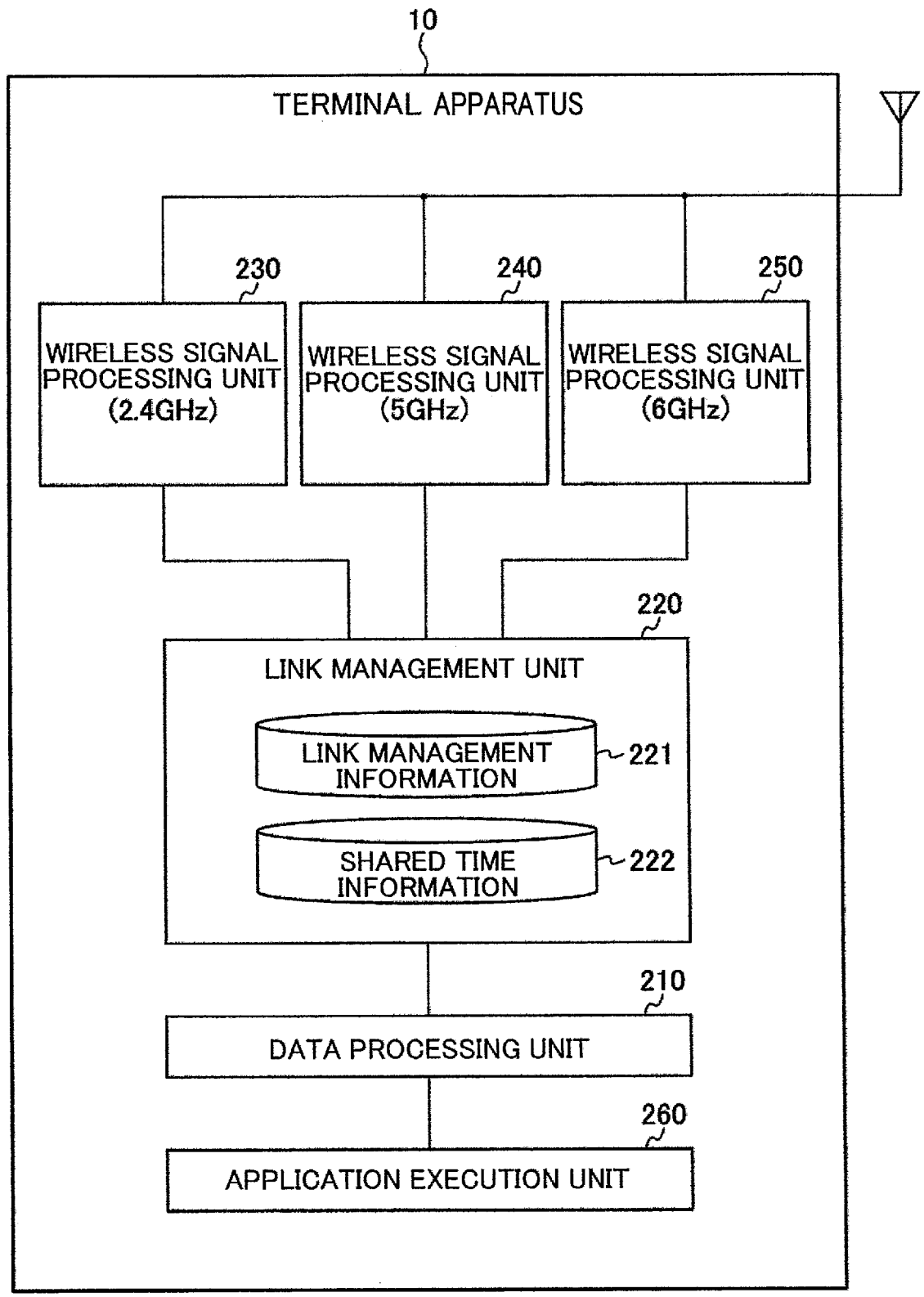
FIG. 21 is a block diagram showing an example of functions of a terminal apparatus included in the wireless system according to the first modification example of the embodiment.

A wireless system 1 according to a first modification example of the embodiment has a configuration in which each STA function always refers to a common local clock. FIGS. 20 and 21 show an example of the functions of a base station 10 and a terminal apparatus 20 included in the wireless system 1 according to the first modification example of the embodiment, respectively.

As shown in FIG. 20, the base station 10 of the first modification example of the embodiment has a configuration in which the time information 131 in the wireless signal processing unit 130, the time information 141 in the wireless signal processing unit 140, and the time information 151 in the wireless signal processing unit 150 are omitted from the base station 10 of the embodiment.

As shown in FIG. 21, the terminal apparatus 20 of the first modification example of the embodiment has a configuration in which the time information 231 in the wireless signal processing unit 230, the time information 241 in the wireless signal processing unit 240, and the time information 251 in the wireless signal processing unit 250 are omitted from the terminal apparatus 20 of the embodiment. Other configurations of the wireless system 1 according to the first modification example of the first embodiment are the same as those of the embodiment.

As described above, in the first modification example of the embodiment, each of the base station 10 and the terminal apparatus 20 does not hold time information for each STA function. In other words, the clock of each STA function of the base station 10 is shared by the shared time information 122 outside the STA function. The clock of each STA function of the terminal apparatus 20 is shared by the shared time information 222 outside the STA function. Even in such a case, each STA function operates always with reference to the shared time information, thereby executing CSMA/CA or the like.

In the first modification example of the embodiment, the shared time information is always referred to, so that time synchronization for each STA function executed in the embodiment is omitted. Therefore, in the first modification example of the embodiment, it is sufficient that the shared time information 122 of the base station 10 and the shared time information 222 of the terminal apparatus 20 are synchronized with each other. As a result, the wireless system 1 according to the first modification example of the embodiment can simplify the operation related to time synchronization as compared with the embodiment.

<4-2> Second Modification Example

A wireless system 1 according to a second modification example of the embodiment sets a primary link to a plurality of links constituting a multi-link. FIG. 22 shows an example of link management information 121 in the wireless system 1 according to the second modification example the embodiment. The link management information 121 shown in FIG. 22 is different from the link management information 121 shown in FIG. 12 in that STA1 is set as a primary link. The description method of the information related to the primary link is not limited to this method, and other methods may be applied.

The primary link is preset, for example, when a multi-link is established between the base station 10 and the terminal apparatus 20. The STA function used for the primary link may be set in priority according to the frequency band or may be set according to the radio wave intensity of the link. Further, the setting of the primary link may be changed as appropriate after the establishment of the multi-link. For example, the radio wave intensity of each link constituting the multi-link may be monitored and the link may be appropriately changed to a link having a high radio wave intensity.

Figure 23:
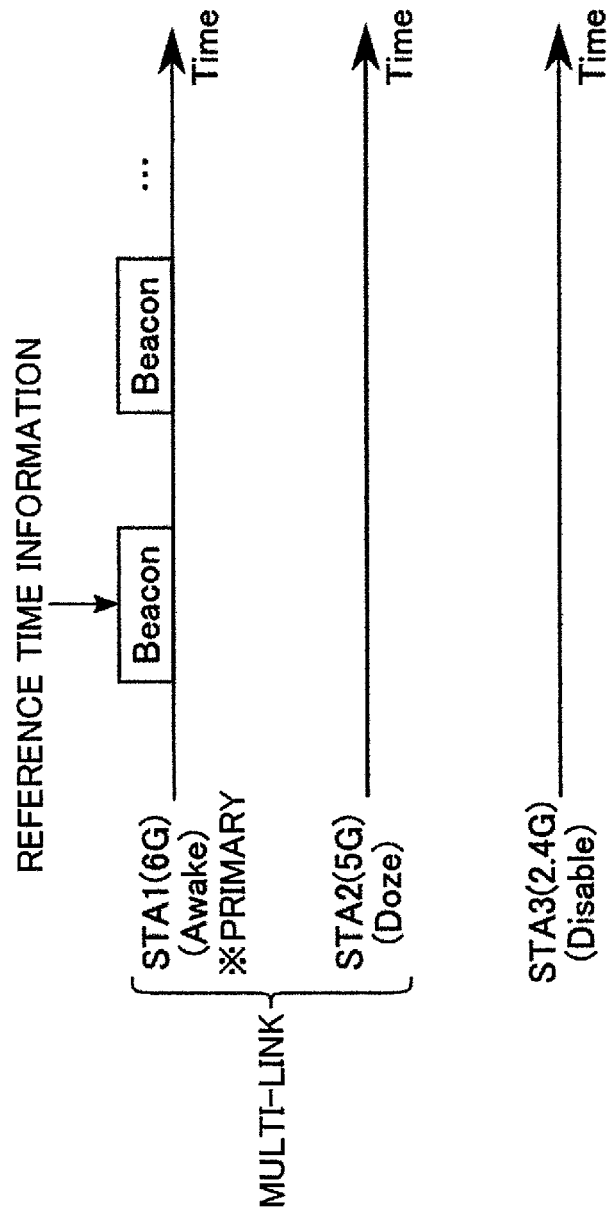
FIG. 23 is a conceptual diagram showing an example of a beacon signal output method in a base station included in the wireless system according to the second modification example of the embodiment.

FIG. 23 shows an example of a beacon signal output method in the base station 10 included in the wireless system 1 according to the second modification example of the embodiment. As shown in FIG. 23, when a primary link is set between the base station 10 and the terminal apparatus 20, the primary link is used as a base of time synchronization.

Specifically, when STA1 and STA2 of the base station 10 constitute a multi-link and the multi-link power saving is applied, the primary link is always set to the Awake state, for example, the other links are set to the Doze state. Then, STA1 corresponding to the primary link in the base station 10 intermittently transmits a beacon signal including the reference time information of the multi-link. In the terminal apparatus 20, STA1 corresponding to the primary link updates the shared time information 222 by using the reference time information included in the beacon signal. Other configurations and operations of the wireless system 1 according to the second modification example of the embodiment are the same as those of the embodiment.

By setting the primary link as described above, the wireless system 1 according to the second modification example of the embodiment can simplify the processing related to the time synchronization of the multi-link as compared with the embodiment.

<4-3> Third Modification Example

A wireless system 1 according to a third modification example of the embodiment establishes the same multi-link as the embodiment by using a plurality of channels CH included in the same frequency band. The multi-link processing in the third modification example of the embodiment is the same as that in which the channel used for the multi-link is changed to a plurality of channels CH included in the same frequency band with respect to the multi-link processing of the embodiment.

Figure 24:
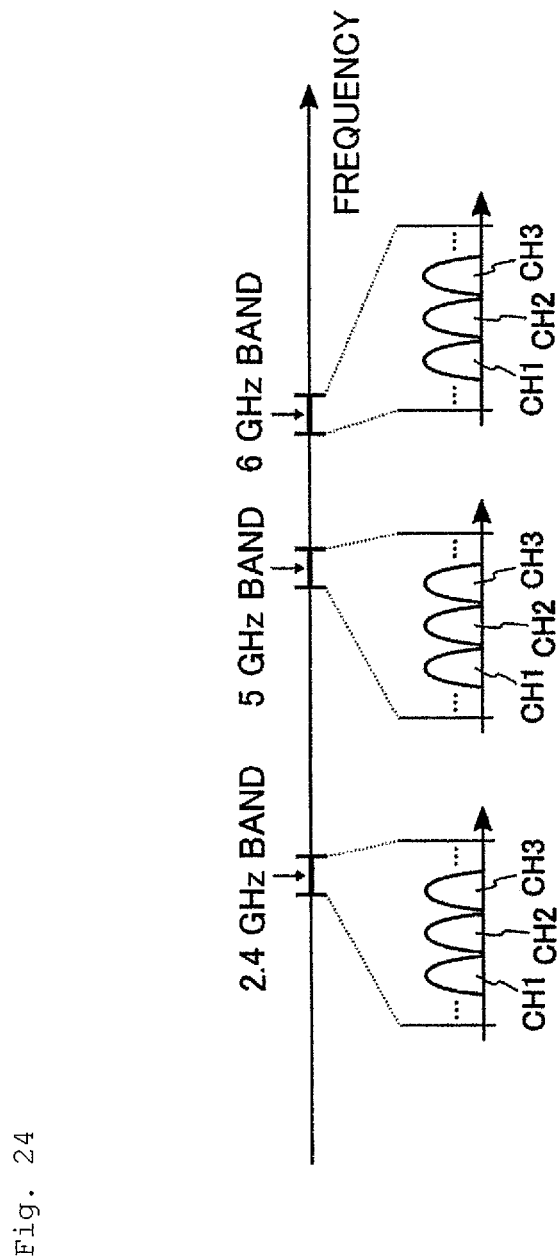
FIG. 24 is a conceptual diagram showing an example of frequency bands used for wireless communication in a wireless system according to a third modification example of the embodiment.

FIG. 24 shows an example of frequency bands used for wireless communication in the wireless system 1 according to the third modification example of the embodiment. As shown in FIG. 24, for example, a 2.4 GHz band, a 5 GHz band, and a 6 GHz band are used in wireless communication. Each frequency band includes a plurality of channels. In this example, it is assumed that each of the 2.4 GHz band, 5 GHz band, and 6 GHz band includes at least three channels CH1, CH2, and CH3. Communication using each channel CH is realized by the associated STA function.

FIG. 25 shows an example of link management information 121 in the wireless system 1 according to the third modification example the embodiment. As shown in FIG. 25, the link management information 121 in the third modification example of the embodiment has a configuration in which information related to the channel ID for each frequency band is added to the link management information 121 in the embodiment. Also, in this example, the same multi-link as in the embodiment is established using the channel CH2 of "STA1" corresponding to the 6 GHz frequency band and the channel CH3 of "STA2" corresponding to the 6 GHz frequency band.

As described above, the same frequency band may be used for each STA function of the base station 10 and the terminal apparatus 20. Also, the multi-link between the base station 10 and the terminal apparatus 20 may be established by a plurality of STA functions using the same frequency band. Specifically, a plurality of STA functions may constitute a multi-link using, for example, different channels CH in the 5 GHz band. Even in such a case, the wireless system 1 according to the third modification example of the embodiment can realize efficient communication and suppress power consumption, similarly to the embodiment.

<5> Others

In the above-described embodiment, each STA function may notify the corresponding link management unit when the link cannot be maintained due to movement of the terminal apparatus 20 or the like. Also, the link management unit 220 of the terminal apparatus 20 may change the multi-link state with the link management unit 120 of the base station based on the notification from the STA function.

Specifically, for example, the link management unit 220 of the terminal apparatus 20 and the link management unit 120 of the base station 10 may change the STA function used in the multi-link as appropriate. When the state of the multi-link is changed, the link management units 120 and 220 update the link management information 121 and 221 respectively. Also, the link management units 120 and 220 may update the association between the traffic and the STA function according to an increase or decrease in the number of links.

The configuration of the wireless system 1 according to the embodiment is merely an example, and other configurations may be used. For example, although a case was illustrated in which each of the base station 10 and the terminal apparatus 20 has three STA functions (wireless signal processing units), the present invention is not limited thereto. The base station 10 may include at least two wireless signal processing units. Similarly, the terminal apparatus 20 may include at least two wireless signal processing units. Also, the number of channels that can be processed by each STA function can be set as appropriate according to the frequency band used. Each of the wireless communication modules 14 and 24 may support wireless communication in a plurality of frequency bands using a plurality of communication modules, or may support wireless communication in a plurality of frequency bands using a single communication module.

Also, the functional configurations of the base station 10 and the terminal apparatus 20 in the wireless system 1 according to the embodiment are merely examples. The functional configuration of the base station 10 and the terminal apparatus 20 may have other names and groupings as long as the operations described in each embodiment can be executed. For example, in the base station 10, the data processing unit 110 and the link management unit 120 may be collectively referred to as a data processing unit. Similarly, in the terminal apparatus 20, the data processing unit 210 and the link management unit 220 may be collectively referred to as a data processing unit.

Also, in the wireless system 1 according to the embodiment, the CPU included in each of the base station 10 and the terminal apparatus 20 may be another circuit. For example, a Micro Processing Unit (MPU) or the like may be used instead of the CPU. Also, each of the processes described in each embodiment may be realized using dedicated hardware. The wireless system 1 according to each embodiment may include both processes executed by software and processes executed by hardware, or may include only one of them.

In each embodiment, the flowchart used to describe the operations is merely an example. Regarding each operation described in the embodiment, the order of processes may be interchanged within an allowable range, or other processes may be added. Also, the format of the wireless frame described in the above embodiment is merely an example. The wireless system 1 may use other wireless frame formats as long as it is possible to execute the operations described in each embodiment.

Note that the present invention is not limited to the above embodiment, and can be modified in various ways without departing from the scope thereof at the implementation stage. In addition, each embodiment may be combined as appropriate, in which case combined effects can be achieved. Furthermore, the foregoing embodiment includes various inventions, and various inventions can be extracted by selecting combinations of a plurality of constituent elements disclosed herein. For example, even if several of the all constituent elements described in the embodiment are removed, a configuration in which those constituent elements have been removed can be extracted as an invention as long as the problem can be solved and the effect can be achieved.

REFERENCE SIGNS LIST

1 Wireless system
10 Base station
20 Terminal apparatus
30 Server
11,21 CPU
12,22 ROM
13,23 RAM
14,24 Wireless communication module
15 Wired communication module
25 Display
26 Storage
110,210
120,220
121,221
122,222
110,210 Data processing unit
120,220 Link management unit
121,221 Link management information
122,222 Shared time information
123 Data categorizing unit
124 Transmission queue
125 CSMA/CA execution unit
126 Data collision management unit
130,140,150,230,240,250 Wireless signal processing unit
131,141,151,231,241,251 Time information

The invention claimed is:

1. A base station comprising:
a first wireless signal processing circuit configured to transmit and receive a wireless signal using a first channel, store first time information, and accumulate a first traffic;
a second wireless signal processing circuit configured to transmit and receive a wireless signal using a second channel different from the first channel, store second time information, and accumulate a second traffic; and
processing circuitry configured to:
 establish a multi-link with a terminal apparatus by using the first wireless signal processing circuit and the second wireless signal processing circuit;
 synchronize the first time information and the second time information based on shared time information for synchronizing the multi-link;
 transmit a beacon signal by using the first wireless signal processing circuit, the beacon signal being capable of indicating the first time information, first information indicating that the first traffic is being accumulated, and second information indicating that the second traffic is being accumulated;
 receive a frame by using the second wireless signal processing circuit, the frame requesting a transmission of the second traffic from the terminal apparatus based on the beacon signal; and
 transmit the second traffic to the terminal apparatus based on the frame by using the second wireless signal processing circuit.

2. The base station according to claim 1, wherein the beacon signal is transmitted from the first wireless processing circuit, and not transmitted from the second wireless processing circuit.

3. The base station according to claim 1, wherein the first time information and the second time information have the same time information.

4. A terminal apparatus comprising:
- a first wireless signal processing circuit configured to transmit and receive a wireless signal using a first channel, and store first time information;
- a second wireless signal processing circuit configured to transmit and receive a wireless signal using a second channel that is different from the first channel, and store second time information; and
- processing circuitry configured to establish a multi-link with a base station by using the first wireless signal processing circuit and the second wireless signal processing circuit, and synchronize the first time information and the second time information, wherein
- in the base station, a first traffic associated with the first wireless signal processing circuit is accumulated, and a second traffic associated with the second wireless signal processing circuit is accumulated, the processing circuitry is further configured to:
- receive a beacon signal by using the first wireless processing circuit, the beacon signal including the first time information, first information indicating whether the first traffic is accumulated or not, and second information indicating whether the second traffic is accumulated or not,
- transmit a frame to the base station by using the second wireless signal processing circuit, the frame requesting a transmission of the second traffic based on the beacon signal, and
- receive the second traffic transmitted from the base station based on the frame by using the second wireless signal processing circuit.

5. The terminal apparatus according to claim 4, wherein the beacon signal is received by the first wireless processing circuit, and not received by the second wireless processing circuit.

6. The terminal apparatus according to claim 5, wherein the first time information and the second time information have the same time information.

* * * * *